(12) United States Patent
Kushner et al.

(10) Patent No.: US 12,124,905 B1
(45) Date of Patent: Oct. 22, 2024

(54) TRANSACTION INSTRUMENT WITH FEATURES FOR DESTRUCTION AND DISPOSAL

(71) Applicant: Wells Fargo Bank, N.A., San Francisco, CA (US)

(72) Inventors: Kristine Ing Kushner, Orinda, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/644,972

(22) Filed: Dec. 17, 2021

(51) Int. Cl.
*G06K 19/077* (2006.01)

(52) U.S. Cl.
CPC ............... *G06K 19/07743* (2013.01)

(58) Field of Classification Search
CPC ....... G06K 19/07743; G06K 19/07443; G06K 19/07798; G06K 19/0772; G06K 19/077; G06K 19/06046; G06K 19/041
See application file for complete search history.

(56) References Cited

U.S. PATENT DOCUMENTS

| | | | | |
|---|---|---|---|---|
| 4,649,418 A | * | 3/1987 | Uden ................ | H01L 23/145 29/841 |
| 5,255,236 A | * | 10/1993 | Maehara ............ | G11C 16/18 365/218 |
| 5,255,430 A | * | 10/1993 | Tallaksen ........ | H01L 21/67144 174/536 |
| 6,035,216 A | * | 3/2000 | Cheng ............... | G06K 13/0806 235/475 |
| 6,315,583 B1 | * | 11/2001 | Nishioka ........... | G06K 13/0856 439/131 |
| 6,472,733 B1 | * | 10/2002 | Le Loc'h ........... | G06K 19/073 257/730 |
| 6,501,390 B1 | * | 12/2002 | Chainer ........... | G06K 19/07372 235/440 |

(Continued)

FOREIGN PATENT DOCUMENTS

| | | |
|---|---|---|
| CN | 2825107 Y | 10/2006 |
| DE | 29824865 U1 | 5/1998 |
| KR | 1020040094264 A | 11/2004 |

OTHER PUBLICATIONS

Johnson, "How Do I Dispose of Chip Credit Cards?," Money Talks News, Retrieved from the Internet: URL: https://www.moneytalksnews.com/how-do-i-dispose-of-chip-credit-cards, Dec. 30, 2019, 5 pp.

*Primary Examiner* — Daniel I Walsh
(74) *Attorney, Agent, or Firm* — Shumaker & Sieffert, P.A.

(57) ABSTRACT

In some examples, a transaction instrument includes a body that defines a first face and a second face, a chip assembly comprising an integrated circuit chip, an aperture in a portion of the body that provides access to a portion of the transaction instrument, and an attachment mechanism configured to secure the chip assembly at least partially within the body and hold the chip assembly substantially flush with the first face of the body. At least one of the body, the attachment mechanism, or a portion of the chip assembly is designed to fail in response to a force applied via the aperture in the body, and wherein the failure of the at least one of the body, the attachment mechanism, or the portion of the chip assembly, destroys the integrated circuit chip of the transaction instrument.

18 Claims, 8 Drawing Sheets

(56) References Cited

U.S. PATENT DOCUMENTS

| | | | | |
|---|---|---|---|---|
| 6,554,193 | B1* | 4/2003 | Fehrman | G06K 19/077 |
| | | | | 235/487 |
| 6,802,008 | B1* | 10/2004 | Ikefuji | G07F 7/1008 |
| | | | | 235/487 |
| 7,753,262 | B2* | 7/2010 | Kingsborough | B42D 25/369 |
| | | | | 235/383 |
| 8,287,386 | B2* | 10/2012 | Miller | G07F 17/3293 |
| | | | | 463/16 |
| 8,328,106 | B1 | 12/2012 | Trujillo | |
| 10,140,569 | B2* | 11/2018 | Kim | G06K 19/07722 |
| 10,614,449 | B1* | 4/2020 | Pham | G06K 19/07737 |
| 10,748,369 | B1* | 8/2020 | Nakhare | G06K 7/082 |
| 10,762,412 | B2* | 9/2020 | Lowe | G06K 19/07792 |
| 10,832,116 | B2* | 11/2020 | Kim | G06K 19/07722 |
| 10,987,668 | B2* | 4/2021 | Mulder | B01L 3/502707 |
| 11,062,191 | B1* | 7/2021 | Maiman | G06K 19/07381 |
| 11,062,192 | B1* | 7/2021 | Gandhi | G07F 7/10 |
| 11,320,916 | B2* | 5/2022 | Park | B43K 25/02 |
| 11,443,159 | B2* | 9/2022 | Johnson | A01H 5/10 |
| 11,645,487 | B2* | 5/2023 | Lotya | G06K 19/07733 |
| | | | | 235/492 |
| 11,842,244 | B2* | 12/2023 | Mullis | G06K 19/0776 |
| 11,907,786 | B2* | 2/2024 | Atkins | G06K 19/07732 |
| 2001/0040186 | A1* | 11/2001 | Okada | G06K 19/07749 |
| | | | | 235/492 |
| 2003/0214794 | A1* | 11/2003 | Takahashi | G06K 19/07728 |
| | | | | 361/761 |
| 2005/0062135 | A1* | 3/2005 | Tase | H01L 21/67092 |
| | | | | 257/E29.022 |
| 2005/0082374 | A1* | 4/2005 | Tsuchimoto | G06K 19/07745 |
| | | | | 235/492 |
| 2005/0189638 | A1* | 9/2005 | Ikeda | H05K 1/0271 |
| | | | | 257/679 |
| 2005/0220377 | A1* | 10/2005 | Hanus | B65D 75/66 |
| | | | | 383/206 |
| 2006/0011731 | A1* | 1/2006 | Anders | G06K 19/077 |
| | | | | 235/492 |
| 2006/0157570 | A1* | 7/2006 | Day | G06K 19/005 |
| | | | | 235/487 |
| 2006/0196945 | A1* | 9/2006 | Mendels | G06K 1/12 |
| | | | | 235/487 |
| 2006/0281229 | A1* | 12/2006 | Koh | B29C 45/14647 |
| | | | | 257/E21.504 |
| 2007/0244709 | A1 | 10/2007 | Gilbert | |
| 2007/0278317 | A1* | 12/2007 | Onishi | G06K 19/07 |
| | | | | 235/495 |
| 2008/0002372 | A1 | 1/2008 | Kelso et al. | |
| 2008/0041965 | A1* | 2/2008 | Phillips | G06K 19/077 |
| | | | | 235/492 |
| 2008/0081689 | A1* | 4/2008 | Seelig | G07F 17/3286 |
| | | | | 463/29 |
| 2008/0156885 | A1* | 7/2008 | Landau | G06K 19/0702 |
| | | | | 235/492 |
| 2009/0019751 | A1* | 1/2009 | Goetting | G09F 3/20 |
| | | | | 40/664 |
| 2009/0236430 | A1* | 9/2009 | Webb | G11B 7/24 |
| | | | | 235/492 |
| 2012/0235870 | A1* | 9/2012 | Forster | H01Q 13/10 |
| | | | | 29/601 |
| 2013/0078910 | A1* | 3/2013 | Akiyama | H04B 5/0075 |
| | | | | 455/11.1 |
| 2013/0163160 | A1* | 6/2013 | Heiskanen | G06K 7/0021 |
| | | | | 361/679.01 |
| 2013/0235511 | A1* | 9/2013 | Lu | H04M 1/0274 |
| | | | | 361/679.01 |
| 2013/0240629 | A1* | 9/2013 | Pesonen | G06K 13/06 |
| | | | | 248/316.4 |
| 2013/0255337 | A1* | 10/2013 | Mullis | E05B 73/0017 |
| | | | | 70/434 |
| 2014/0209688 | A1* | 7/2014 | Branca, Jr. | G06F 3/03545 |
| | | | | 235/492 |
| 2014/0361086 | A1* | 12/2014 | Finn | H01Q 7/00 |
| | | | | 235/492 |
| 2015/0076239 | A1* | 3/2015 | Arai | G06K 19/07739 |
| | | | | 235/492 |
| 2015/0097039 | A1* | 4/2015 | Narendra | G07F 7/0893 |
| | | | | 235/492 |
| 2015/0161500 | A1* | 6/2015 | Kim | H04B 1/3827 |
| | | | | 29/601 |
| 2015/0278674 | A1* | 10/2015 | Schoengrundner | G06K 19/07754 |
| | | | | 438/26 |
| 2016/0297565 | A1* | 10/2016 | Roszyk | B65D 61/00 |
| 2017/0159919 | A1* | 6/2017 | Feng | H05B 45/10 |
| 2017/0344869 | A1* | 11/2017 | Williams | B32B 37/12 |
| 2018/0156854 | A1* | 6/2018 | Verhoeven | G06K 19/07798 |
| 2018/0197060 | A1* | 7/2018 | Yamaoka | G06K 19/0716 |
| 2018/0197065 | A1* | 7/2018 | Yamaoka | G06K 19/0776 |
| 2018/0225560 | A1* | 8/2018 | Schneider | G06K 7/10366 |
| 2019/0138773 | A1* | 5/2019 | Verraes | F16B 39/021 |
| 2019/0155335 | A1* | 5/2019 | Lalinde | G06F 3/0488 |
| 2019/0205725 | A1* | 7/2019 | Wang | G08B 13/2417 |
| 2020/0361229 | A1 | 11/2020 | Herrington et al. | |
| 2020/0372318 | A1* | 11/2020 | Bryant | B65D 55/028 |
| 2021/0049431 | A1* | 2/2021 | Finn | G06K 19/07722 |
| 2021/0055637 | A1* | 2/2021 | Nakamura | H04N 5/772 |
| 2021/0110231 | A1* | 4/2021 | Finn | G06K 19/025 |
| 2021/0150294 | A1* | 5/2021 | Finn | G06K 19/045 |
| 2021/0154898 | A1* | 5/2021 | Lowe | B22D 19/00 |
| 2021/0241283 | A1* | 8/2021 | Kumawat | G06Q 20/4093 |
| 2021/0303962 | A1* | 9/2021 | Pueschner | G06K 19/07747 |
| 2022/0108796 | A1* | 4/2022 | Chapman | A61B 5/6833 |
| 2022/0123775 | A1* | 4/2022 | Cohen | G06K 13/0812 |
| 2022/0147785 | A1* | 5/2022 | Placitelli | G06K 19/07769 |
| 2023/0062892 | A1* | 3/2023 | Hori | E05B 49/002 |
| 2023/0101831 | A1* | 3/2023 | Light | H05K 1/186 |
| | | | | 361/749 |
| 2023/0123983 | A1* | 4/2023 | Carrier | H01L 23/573 |
| | | | | 257/784 |
| 2023/0137393 | A1* | 5/2023 | Lotya | G06K 19/07794 |
| | | | | 29/850 |
| 2023/0274119 | A1* | 8/2023 | Baldischweiler | G06K 19/07749 |
| | | | | 235/488 |
| 2023/0406027 | A1* | 12/2023 | Keagy | B29C 64/30 |
| 2024/0111985 | A1* | 4/2024 | Baldischweiler | G06K 19/02 |

* cited by examiner

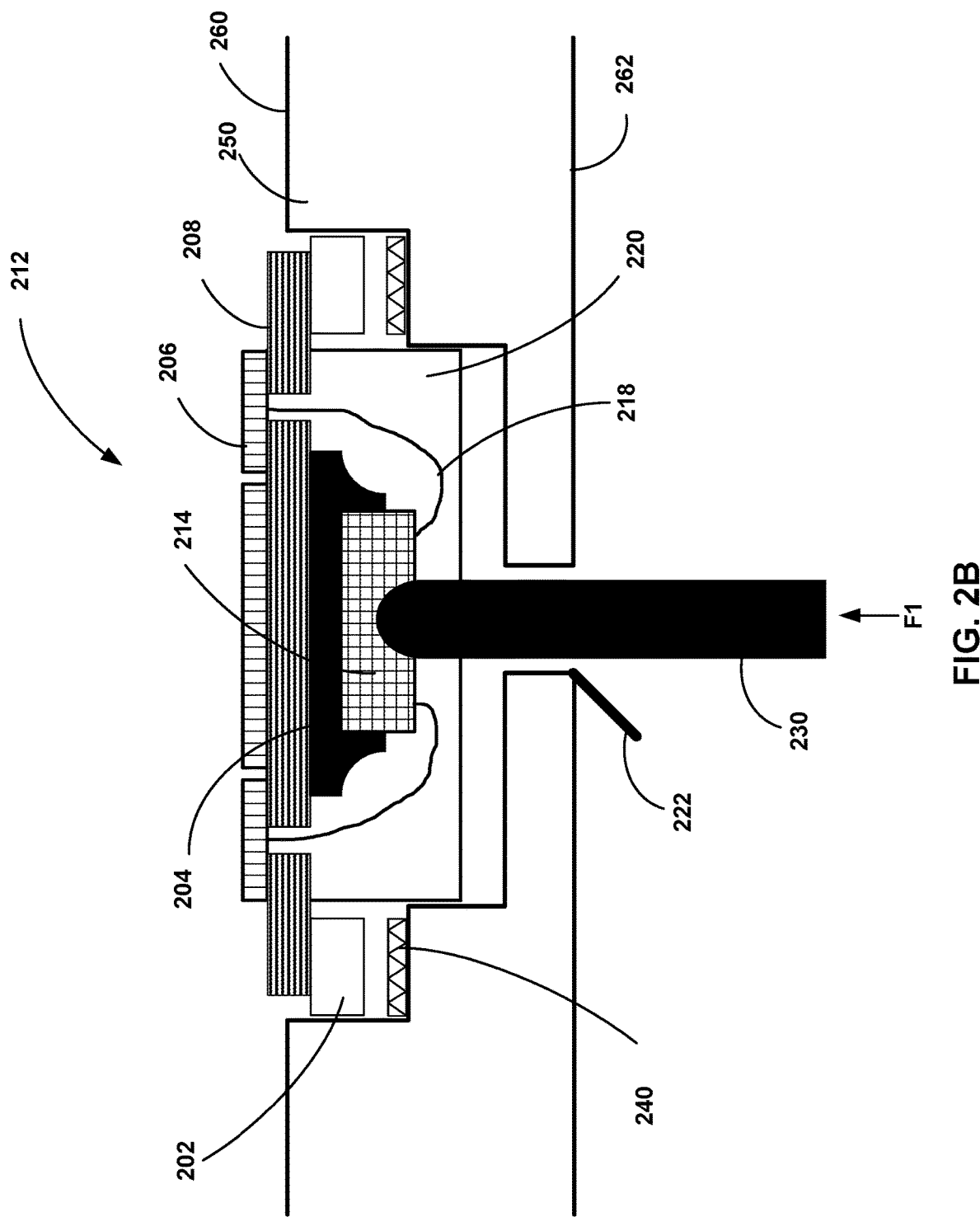

TRANSACTION INSTRUMENT WITH FEATURES FOR DESTRUCTION AND DISPOSAL

TECHNICAL FIELD

The invention relates to transaction instruments and methods for securing the same.

BACKGROUND

Transaction instruments, such as credit cards and debit cards, have long provided users with a convenient payment option at a majority of merchants. Transaction instruments include unique information that links the card to a user's account with a financial institution (e.g., a bank or a non-bank card issuer). For example, in the case of a traditional credit card, the account may comprise an amount of credit available to the user, or in the case of a debit card, the account may comprise a checking or savings account that belongs to the user. Transaction instruments typically include the user's name, the account number, an expiration date, and a card security code (CSC) (alternatively referred to as a card verification value (CVV) or card verification code (CVC)) printed or embossed on the physical card. In some examples, transaction instruments may further include other elements such as, for example, a company name, a client tenure, a logo, an image, or the like. Transaction instruments may also include a magnetic stripe or an integrated circuit (IC) that is attached to the physical card and encoded with the unique information.

SUMMARY

In general, this disclosure describes articles, systems, and techniques relating to destructible transaction instruments. The techniques described herein enable a transaction instrument to be fabricated in a manner that allows for easy destruction of the internal circuitry of the transaction instruments. Allowing easier destruction of the internal circuitry of transaction instruments promotes data security and consumer confidence during disposal of the transaction instruments.

In some examples, a transaction instrument includes: a body that defines a first face and a second face, wherein the first face and second face are on opposing sides of the body; a chip assembly comprising an integrated circuit chip, an encapsulation around the integrated circuit chip, and one or more surface contacts connected to the integrated circuit chip via circuitry; an attachment mechanism configured to secure the chip assembly at least partially within the body and hold the chip assembly substantially flush with the first face of the body; and an aperture in a portion of the body that provides access to a portion of the transaction instrument. At least one of the body, the attachment mechanism, or a portion of the chip assembly is designed to fail in response to a force applied via the aperture in the body, and wherein the failure of the at least one of the body, the attachment mechanism, or the portion of the chip assembly, destroys the integrated circuit chip of the transaction instrument.

In some examples, a method of manufacturing a transaction instrument includes: forming a body that defines a first face and a second face, wherein the first face and second face are on opposing sides of the body; forming a chip assembly comprising an integrated circuit chip, an encapsulation around the integrated circuit chip, and one or more surface contacts connected to the integrated circuit chip via circuitry; securing the chip assembly at least partially within the body and substantially flush with the first face of the body via an attachment mechanism; and forming an aperture in a portion of the body that provides access to a portion of the transaction instrument, wherein at least one of the body, the attachment mechanism, or a portion of the chip assembly is designed to fail in response to a force applied via the aperture in the body, wherein the failure of the at least one of the body, the attachment mechanism, or the portion of the chip assembly, destroys the integrated circuit chip of the transaction instrument.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2B is a conceptual diagram illustrating a rigid member exerting a force on the example chip assembly of FIG. 2A, in accordance with the techniques of this disclosure.

DETAILED DESCRIPTION

Aspects of the disclosure are related to systems and methods for using a transaction instrument that contains structural weaknesses to allow secure destruction of the transaction instrument. The transaction instrument includes one or more integrated circuit (IC) chips that store the identifying information. The identifying information may include financial information. The transaction instrument may be configured to fail in such a way as to destroy the integrated circuit chip, and/or other internal circuitry. Transaction instruments with destroyed integrated circuit chips may be safely disposed without fear of malicious third parties stealing financial information from the disposed transaction instrument.

Transaction instruments are frequently replaced. They regularly expire and are redesigned, clients often open new accounts, and transaction instruments may need to be destroyed in response to potential security breaches. Scissors can be used to destroy transaction instruments made of some materials, but are useless or inefficient in destroying transaction instruments made of certain materials (e.g., metal, wood, etc.), and time consuming for many other transaction instruments. In addition, many clients do not know exactly where to cut with scissors to make sure functional aspects of a transaction instrument are properly disabled. Clients need a simple, safe way to destroy the transaction instrument in these scenarios in order to keep their financial data secure.

Aspects of the disclosure relate to a transaction instrument that includes an aperture in a portion of a body of the transaction instrument that provides access to a portion of the transaction instrument, as well as an attachment mechanism configured to secure a chip assembly at least partially within the body. At least one of the body, the attachment mechanism, or a portion of the chip assembly is designed to fail in response to a force applied via the aperture in the body. The failure of the at least one of the body, the attachment mechanism, or the portion of the chip assembly, destroys an IC chip of the transaction instrument. After destruction of the IC chip of the transaction instrument, the transaction instrument may be safely discarded without fear of the identifying information being stolen by malicious third parties.

Aspects of the disclosure relate to a method of manufacturing a transaction instrument, including forming a body, forming a chip assembly, securing the chip assembly at least partially within the body via an attachment mechanism, forming an aperture in a portion of the body that provides access to a portion of the transaction instrument, and designing at least one of the body, the attachment mechanism, or a portion of the chip assembly to fail in response to a force applied via the aperture of the body. The failure of the at least one of the body, the attachment mechanism, or the portion of the chip assembly, destroys an IC chip of the transaction instrument.

Figure 1A:
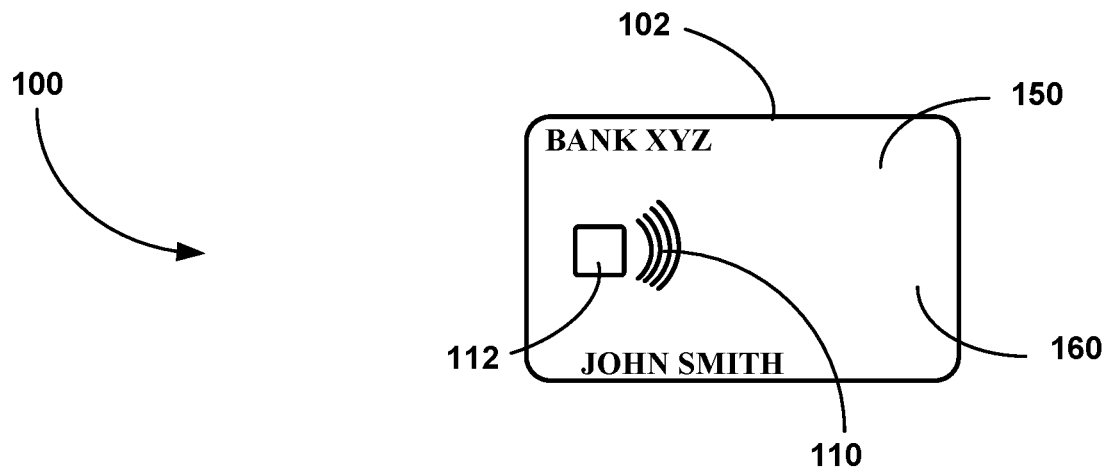
FIGS. 1A and 1B are conceptual diagrams illustrating an example transaction instrument in accordance with the techniques of this disclosure.
Figure 1B:
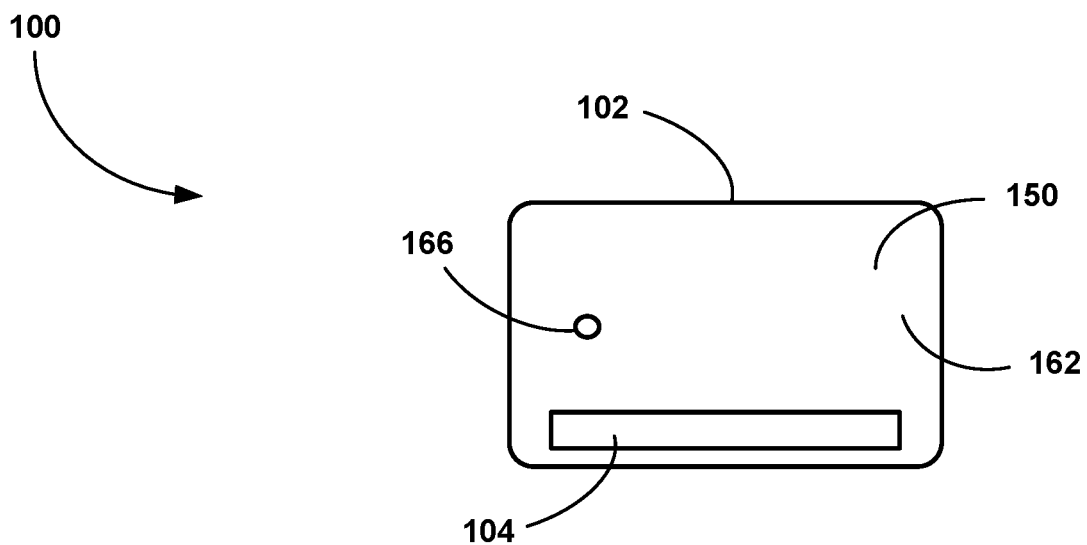

FIGS. 1A and 1B are conceptual diagrams illustrating an example transaction instrument 100 in accordance with the techniques of this disclosure. The example transaction instrument 100 may store identifying data on one or more IC chips 112, and may transmit data using one or more antennas 110. It is to be understood that the antennas 110 are depicted using signal lines for purposes of illustration only, and that antennas 110 may be encapsulated within or on the surface of transaction instrument 100 and comprise any shape and size configured to function as described herein. Transaction instrument 100 may be a credit card, debit card, or some other type of identifying card that includes a set of unique information (e.g., a driver's license or student ID, a work badge, a parking card, or a hotel key card). Though transaction instrument 100 is depicted in a rectangular shape, in some examples transaction instrument 100 may be formed into any shape (e.g., square, circular, triangular, etc.).

Though transaction instrument 100 is depicted with one IC chip 112 for purposes of illustration, in other examples transaction instrument 100 may have two or more IC chips 112. IC chip 112 may include processing circuitry, a memory to store the identifying data, and a physical connection to antennas 110. IC chip 112 may further include other circuitry components understood by one of ordinary skill in the art to be used to execute the functions of a transaction instrument. The memory of IC chip 112 may store sensitive financial information of the user, authentication information, or other information related to transaction instrument 100. For example, IC chip 112 may include user account information linked to transaction instrument 100 for use during transactions with a merchant's point-of-sale (POS) device or another computing device. Transaction instrument 100 may further include a magnetic stripe 104 for swiping and/or IC chip 112 may be configured to be readable by a conventional chip reader (e.g., as a result of inserting transaction instrument 100 into the chip reader). In some examples, transaction instrument 100 may be configured to utilize antennas 110 of transaction instrument 100 even when a transaction is executed using a conventional chip reader (e.g., by sending data using antennas 110 to initiate a payment transaction or sending transactional details in a receipt signal upon execution of a transaction). In some examples, transaction instrument 100 may be a contactless transaction instrument capable of sending data for payments or other transactions without direct contact to a chip reader, magnetic stripe reader, or other reading device. In some examples, transaction instrument 100 may conform to standards set forth by the international organization for standardization (ISO). For example, transaction instrument 100 may conform to ISO standards for identification cards and/or financial transaction cards. In some examples, transaction instrument 100 may define new standards.

The identifying information stored on transaction instrument 100 may include information related to a cardholder of transaction instrument 100, such as a name, username, telephone number, email address, identification number (e.g., driver's license number, student identification number, work identification number), or the like. The identifying information may include unique financial information about the cardholder, such as an account number, routing number, passcode, PIN, password, or the like that identifies a financial account of the cardholder at a financial institution (e.g., the financial institution that issues transaction instrument 100).

In the illustrated example of FIGS. 1A and 1B, transaction instrument 100 includes a body 150 that defines a first face 160 and a second face 162 (together faces 160, 162), where first face 160 and second face 162 are on opposing sides of body 150. Faces 160, 162 are defined as "first" and "second" arbitrarily for ease of description, and in some examples may just as easily be described as the other. The body and faces of transaction instrument 100 may be made of any material, such as polymer (e.g., polyvinyl chloride acetate), carbon fiber, steel or other metal, wood/pulp, glass, ceramics, or some combination of these or other materials. In some examples, transaction instrument 100 is made entirely or almost entirely of certain materials. In some examples, the transaction instrument is made primarily of metal, with one or more thin polymer layers and any payment elements, such as IC chip 112, antennas 110, magnetic stripe 104, or the like. In some examples, body 150 may be made primarily from metal, while faces 160, 162 include a thin polymer layer disposed on top of body 150. In some examples, a customized shape or layers of transaction instrument 100 may be formed via 3D printing. The materials used to manufacture transaction instrument 100 may be selected to ensure that transaction instrument 100 is sturdy enough to survive day-to-day use, however transaction instrument 100 may be difficult to destroy when it expires or is replaced.

Transaction instrument 100 may be configured to couple to antennas 110 to the IC chip 112. Antennas 110 may include short-range and/or long-range antennas. Short-range antennas may be radio frequency (RF) antennas, such that transaction instrument 100 is a radio frequency identification (RFID) card. Transaction instrument 100 may not include a battery or other power source for IC chip 112 or antennas 110. Instead, transaction instrument 100 may be powered by electromagnetic fields created by interrogating signals that are received by one of antennas 110. When powered by the received interrogating signals, IC chip 112 may send reply signals containing certain information of the memory of IC chip 112 using the respective antenna 110. Antennas 110 may be configured to send and receive signals through faces 160, 162 of transaction instrument 100. In some examples, a first antenna of antennas 110 may be configured to send and receive signals through first face 160 and a second antenna of antennas 110 may be configured to send and receive signals through second face 162. IC chip 112 may be configured to cause antennas 110 to transmit signals. IC chip 112 may be part of a chip assembly that is visible and extends to at least one of faces 160, 162 of transaction instrument 100 to enable transaction instrument 100 to be inserted and read by a "dip" chip reader. In some examples, a portion of the chip assembly may be substantially flush with one or more of faces 160, 162.

First face 160 may generally define outer edges 102. Similarly, second face 162 may generally define outer edges 102. Front face 160 and back face 162 may be substantially the same shape, however, both the specific shape of transaction instrument 100 and the specific location of components on transaction instrument 100 are depicted for purposes of illustration only, as other general shapes or component locations may be used in other examples. For example, transaction instrument 100 may have less rounded corners and/or a location of antennas 110, magnetic stripe 104, and/or IC chip 112 may be changed in other examples.

Transaction instrument 100 also includes aperture 166 in a portion of the body of transaction instrument 100. Aperture 166 may provide access to a portion of transaction instrument 100. For example, aperture 166 may provide access to a portion of an interior of the body. Although in FIG. 1, aperture 166 is located on second face 162, in some examples it may be located anywhere on transaction instrument 100. For example, aperture 166 may be located in a portion of the body along edge 102. Although aperture 166 is depicted in FIG. 1B as a circular hole, in some examples, aperture 166 may be a hole or cutout of any shape (e.g., square, rectangular, triangular, etc.). In some examples, aperture 166 may include a channel in one or more faces 160, 162 of body 150, where the channel extends through one or more portions or an entirety of a length of body 150. In some examples, aperture 166 may include multiple perforations in one or more faces 160, 162 of body 150. In some examples, aperture 166 may be designed to blend in with the design of transaction instrument 100 so that it is not easily apparent where aperture 166 is located. For example, a design of transaction instrument 100 may include a number of dark circles on one of faces 160, 162, wherein one of the dark circles is aperture 166 and the other dark circles are part of the artistic design on the faces 160, 162. A client may be informed of the location of aperture 166 when the client requests replacement of transaction instrument 100.

Transaction instrument 100 may include a cover on the portion of body 150 over aperture 166. The cover may be configured to destructively yield in response to a force applied to the cover. For example, the cover may be made from a polymer that punctures when pressed on by a rigid member, such as a paperclip. In some examples, the cover may be a part of a polymer layer of body 150 on one of faces 160, 162. In some examples, the cover may be designed to blend in with the design of transaction instrument 100, so that it is not apparent where aperture 166 is located on transaction instrument 100. For example, an artistic design on one or more of faces 160, 162 of transaction instrument 100 may include a carriage, wherein an artistic design on the cover is a wheel of the carriage, and aperture 166 is located in the portion of body 150 underneath the hub of the wheel. A client may be informed of the location of the cover and aperture 166 when the client requests replacement of transaction instrument 100.

IC chip 112 may be part of a chip assembly of transaction instrument 100. The chip assembly may include IC chip 112, an encapsulation around IC chip 112, and one or more surface contacts connected to IC chip 112 via circuitry. The surface contacts may allow IC chip 112 to communicate with an external device, e.g., a chip reader device, in contact with the contacts, e.g., without using antennas 110. Transaction instrument 100 may also include an attachment mechanism configured to secure the chip assembly at least partially within body 150, and hold the chip assembly substantially flush with at least first face 160 of body 150.

When it comes time to replace transaction instrument 100, it may be important for clients to destroy transaction instrument 100 to keep their personal and financial data secure. Destruction may be difficult, especially when transaction instrument 100 is made of hard materials such as metal. A client may also not know how to properly destroy transaction instrument 100 so as to prevent access to personal and financial information stored on transaction instrument 100. Services may be offered for secure destruction of transaction instruments, however anytime transaction instrument 100 leaves control of the client, there is potential for another individual to misuse transaction instrument 100. An individual with knowledge of the structures of transaction instruments may be able to access personal and financial information even after body 150 of transaction instrument 100 is destroyed, if the chip assembly, IC chip 112, and/or magnetic stripe 104 remain intact.

In accordance with the current disclosure, parts of transaction instrument 100 may be designed to fail to allow for easy destruction of transaction instrument 100 to prevent unauthorized access to personal and financial information stored on transaction instrument 100. For example, at least one of body 150, the attachment mechanism of the chip assembly, or a portion of the chip assembly may be designed to fail in response to a force applied via aperture 166 in body 150, and the failure of the at least one of body 150, the attachment mechanism, or the portion of the chip assembly, destroys an IC chip 112 of transaction instrument 100.

In some examples, aperture 166 may include a hole in second face 162 extending through body 150 from second face 162 to the chip assembly, the hole being configured to allow a rigid member access to the chip assembly from second face 162. The attachment mechanism of the chip assembly may include structural weaknesses configured to destructively yield in response to a force applied to the chip assembly from the rigid member.

In some examples, transaction instrument 100 may include edge 102 extending between first face 160 and second face 162 along a perimeter of transaction instrument 100. Aperture 166 may be located in a portion of the edge between first face 160 and second face 162, and may be configured to allow a planar member access to an interior of body 150 between first face 160 and second face 162. Body 150 may include structural weaknesses configured to destructively yield in response to a force applied to first face 160 and second face 162 from the planar member.

In some examples, transaction instrument 100 may include a rod having a length with a first end and second end that is housed within body 150. The first end of the rod may be located substantially at the edge of transaction instrument 100 when the rod is in an unejected state. Transaction instrument 100 may be configured to allow the rod to eject a distance from the edge of body 150. The rod may be attached at one or more points along the length to at least one of the body, the attachment mechanism, or a portion of the chip assembly of transaction instrument 100. When a pulling force is exerted on the rod when in the ejected state, the rod may be configured to transmit a corresponding force to the at least one of body 150, the attachment mechanism, or a portion of the chip assembly. The at least one of body 150, the attachment mechanism, or a portion of the chip assembly may be configured to destructively yield in response to the corresponding force.

In some examples, one or more components of transaction instrument 100 may be configured to weaken when exposed to heat (for example when exposed to an open flame or submerged in hot water). For example, the cover may be made from a polymer that weakens when exposed to heat to allow the cover to be more easily perforated, granting easier access to aperture 166. In some examples, portions of body 150 like magnetic stripe 104 may be configured to deform when exposed to heat such that magnetic stripe 104 is disabled.

In some examples, aperture 166 may define a channel in one or more faces 160, 162 of body 150. In some examples the channel may extend through an entirety of a length of body 150. For example, the channel of aperture 166 may be located within body 150 from one of faces 160, 162 extending the entirety of the length of body 150, where the chip assembly is located in a portion of the length along the channel. Body 150 at aperture 166 may be configured to bend along the channel when a torque force is exerted on body 150 (for example if body 150 is crushed in a doorway jamb along the channel of aperture 166) around a longitudinal axis defined by the length of the channel of aperture 166. In some examples, the channel may extend through one or more portions of body 150, and may define a pattern on body 150. Body 150 may be configured to bend along one or more portions of the channel when a torque force is exerted on body 150 along the one or more portions of the channel. Body 150 may be configured to transmit at least a portion of the torque force to the attachment mechanism, the chip assembly, antennas 110, and/or magnetic stripe 104. The attachment mechanism, the chip assembly, antennas 110, and/or magnetic stripe 104 may be configured to destructively yield in response to the portion of the torque force exerted on body 150.

In some examples, aperture 166 may define a series of perforations in one or more faces 160, 162 of body 150. In some examples the series of perforations may extend through an entirety of a length of body 150. For example, the series of perforations may be located within body 150 from one of faces 160, 162 extending the entirety of the length of body 150, where the chip assembly is located in a portion of the length along the series of perforations. Body 150 at the series of perforations may be configured to bend along the series of perforations when a torque force is exerted on body 150. In some examples, the series of perforations may extend through one or more portions of body 150, and may define a pattern on body 150. Body 150 may be configured to bend along one or more portions of the series of perforations when a torque force is exerted on body 150 along the one or more portions of the series of perforations. Body 150 may be configured to transmit at least a portion of the torque force to the attachment mechanism, the chip assembly, antennas 110, and/or magnetic stripe 104. The attachment mechanism, the chip assembly, antennas 110, and/or magnetic stripe 104 may be configured to destructively yield in response to the portion of the torque force exerted on body 150.

In some examples, transaction instrument 100 may include brittle structures within body 150 near internal circuitry like IC chip 112, antennas 110, and/or magnetic stripe 104. When a force is exerted on body 150 near the brittle structures, the brittle structures may be configured to destructively yield such that the brittle structures shatter and puncture (or otherwise apply a force to) nearby internal circuitry. The internal circuitry may be configured to destructively yield when acted on by the puncture, destroying the internal circuitry.

In some examples, transaction instrument 100 may include an internal channel from aperture 166 to internal circuitry of transaction instrument 100. Body 150 may include a cover over aperture 166 configured to fail in response to a force applied to the cover. The failure may define an opening in the cover such that liquid may be allowed to pass into the internal channel of transaction instrument 100 and into contact with the internal circuitry. The internal circuitry (e.g., chip assembly, IC chip 112, antennas 110, magnetic stripe 104) may be configured to fail in response to liquid exposure, resulting in destruction of at least IC chip 112.

In some examples, a surface of the chip assembly may be substantially flush with one of faces 160, 162 of body 150, for example first face 160. The surface of the chip assembly may be configured to adhere to an adhesive strip applied to first face 160. When the adhesive strip is removed from first face 160, the adhesive strip may apply a force to the chip assembly. An attachment mechanism and/or a portion of the chip assembly may be designed to fail in response to the force applied by the adhesive strip, and the failure may destroy IC chip 112. In some examples, the adhesive strip may prevent use of the chip assembly after the adhesive strip is applied to first face 160. In some examples, a portion of body 150, (e.g., a polymer layer on first face 160) may be designed to fail in response to the force applied by the adhesive strip. For example, a number of perforations may be designed in a portion of a polymer layer on first face 160, where the polymer layer on first face 160 is designed to tear along the perforations in response to the force applied by the adhesive strip. In some examples, magnetic stripe 104 may be disposed at least partially along a path defined by the perforations such that a portion of magnetic stripe 104 tears along the perforations in response to the force applied by the adhesive strip.

In some examples, parts of transaction instrument 100 may be designed to fail such that failure results in the chip assembly being separated from body 150. This may allow chip assembly (including IC chip 112) to be easily crushed, destroying IC chip 112 and any personal and financial information on IC chip 112. The chip assembly may be crushed, for example, using a shoe, mallet, eating utensil, or other tool.

In some examples, transaction instrument 100 may be designed such that in response to the failure of the at least one of body 150, the attachment mechanism, or a portion of the chip assembly, one or more components of the transaction instrument separate from each other in accordance with different recycling categories. For example, the attachment mechanism may be designed to fail such that, when it fails, the chip assembly separates from body 150, and may be separately discarded from body 150. In some examples, portions of body 150 may be designed to fail such that one or more polymer layers on faces 160, 162 can be peeled away from the rest of body 150, wherein the rest of body 150 may be made of recyclable metal, or biodegradable wood. In this way, different parts of transaction instrument 100 with different recycling categories may be separated for disposal.

Figure 2A:
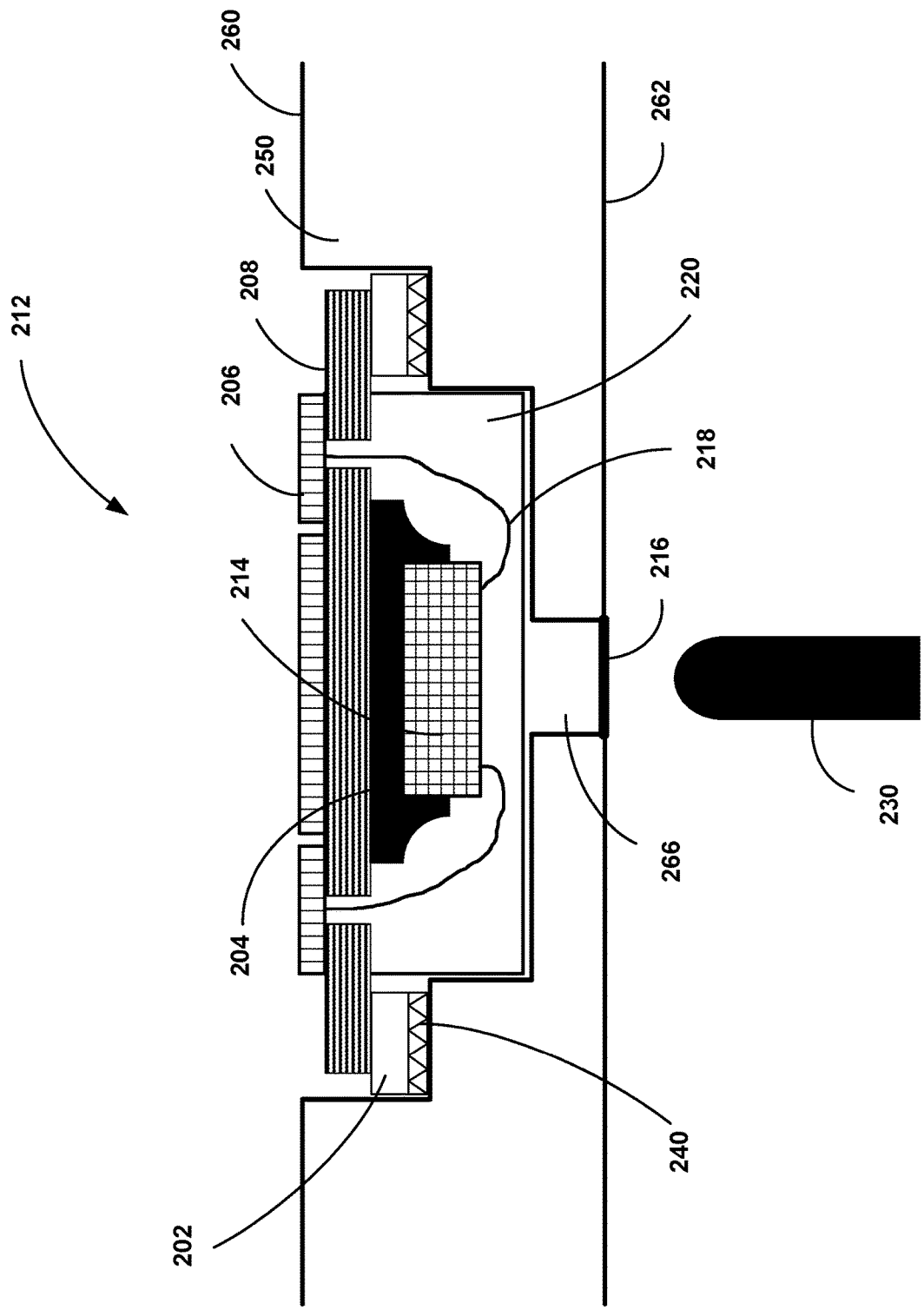
FIG. 2A is a conceptual diagram illustrating an example chip assembly of an example transaction instrument, in accordance with the techniques of this disclosure.

FIG. 2A is a conceptual diagram illustrating an example chip assembly 212 in an example transaction instrument body 250, in accordance with the techniques of this disclosure. Chip assembly 212 may be an example of IC chip 112 of FIG. 1, and body 250 may be an example of body 150 of FIG. 1, etc. Chip assembly 212 and circuitry of chip assembly 212 illustrated in FIG. 2A is just an example, and other configurations for chip assembly 212 and its circuitry are contemplated by this disclosure.

Chip assembly 212 includes IC chip 214, which includes processing circuitry and a memory that may contain personal and financial information of a client that should be destroyed when the transaction instrument is replaced. Chip assembly 212 includes surface contacts 206 which are substantially flush with first face 260 of body 250. Surface contacts 206 are attached to substrate 208, which is attached to attachment mechanism 202. IC chip 214 is surrounded by encapsulation 220, and attached to substrate 208 via adhesive 204. IC chip 214 may be connected to surface contacts 206 via circuitry 218. Circuitry 218 may consist of one or more bond wires. Attachment mechanism 202 may include structural weaknesses 240, designed to fail in response to a force applied via an aperture in body 250. In some examples, attachment mechanism 202 consists of solder joints.

In some examples, the aperture may include hole 266 in second face 262 extending through body 250 from second face 262 to chip assembly 212, hole 266 being configured to allow rigid member 230 access to chip assembly 212 from second face 262. In some examples, chip assembly 212 may be substantially flush with second face 262 and hole 266 may extend through body 250 from first face 260 to chip assembly 212.

Body 250 includes first face 260, second face 262 (together faces 260, 262), and cover 216 on the portion of body 250 over hole 266. Cover 216 may be configured to destructively yield in response to a force applied to cover 216. For example, cover 216 may be made from a polymer that punctures when acted on by a force from rigid member 230. Rigid member 230 may be any rigid structure that can puncture cover 216 and pass through hole 266, such as a paperclip, pen, or the like. In some examples, cover 216 may be a part of a polymer layer of body 250 on one the faces 260, 262 of body 250. In some examples, cover 216 may be designed to blend in with an artistic design on one of the faces 260, 262 of body 250, so that it is not visually apparent where hole 266 is located on body 250. In some examples, cover 216 may be configured to weaken when exposed to heat, such that cover 216 destructively yields more easily in response to a force applied to cover 216.

Attachment mechanism 202 of chip assembly 212 may include structural weaknesses 240 configured to destructively yield in response to a force applied to chip assembly 212 from rigid member 230. In FIG. 2A, a force has not been applied on chip assembly 212 and structural weaknesses 240 are still intact.

FIG. 2B is a conceptual diagram illustrating rigid member 230 exerting a force, $F_1$, on chip assembly 212 of FIG. 2A, in accordance with the techniques of this disclosure. In FIG. 2B, rigid member 230 is applying force $F_1$ to chip assembly 212, and structural weaknesses 240 have destructively yielded (i.e., failed). The structures of chip assembly 212 may be rigid and firmly attached enough that at least a portion of force $F_1$ is applied to attachment mechanism 202 to cause structural weaknesses 240 to destructively yield.

Although FIG. 2B depicts structural weaknesses 240 in attachment mechanism 202, in some examples, structural weaknesses exist in encapsulation 220 and/or IC chip 214. For example, the aperture in body 250 may include hole 266 extending through body 250 from second face 262 to chip assembly 212, hole 266 being configured to allow rigid member 230 access to encapsulation 220 of chip assembly 212 from second face 262. As shown in FIGS. 2A and 2B, encapsulation 220 is the first structure rigid member 230 may interact with on chip assembly 212 in the shown configuration. Encapsulation 220 may be configured to destructively yield in response to force $F_1$ applied to chip assembly 212 from rigid member 230. Encapsulation 220 may yield in such a way that force $F_1$ or a portion thereof is applied to IC chip 214. IC chip 214 may be configured to destructively yield in response to force $F_1$ or the portion thereof applied to IC chip 214, causing IC chip 214, along with the memory in IC chip 214 to be destroyed. In some examples, any number of structures of chip assembly 212 may be configured to destructively yield in response to force $F_1$ or a portion thereof applied to chip assembly 212.

Although not shown in FIGS. 2A and 2B, hole 266 may be positioned on body 250 over a magnetic stripe of the transaction instrument, such that when cover 216 destructively yields, the magnetic stripe is functionally destroyed. Similarly, the transaction instrument may include circuitry connecting chip assembly 212 to one or more antennas of the transaction instrument. The circuitry may be configured to destructively yield in response to force $F_1$ or a portion thereof applied to chip assembly 212. In some examples, the circuitry connecting chip assembly 212 to one or more antennas of the transaction instrument may be positioned in or near hole 266 such that the connective circuitry destructively yields in response to force $F_1$ applied directly to the connecting circuitry.

In some examples, attachment mechanism 202 may be designed to fail such that failure results in chip assembly 212 being separated from body 250, allowing chip assembly 212 to pop out. This may allow chip assembly 212, including IC chip 214, to be easily crushed, destroying IC chip 214 and any personal and financial information in chip assembly 212. The chip assembly may be crushed, for example, using a shoe, mallet, eating utensil, or other tool.

In some examples, the transaction instrument may be designed such that, in response to the failure of the one or more parts of the transaction instrument, one or more components of the transaction instrument separate from each other in accordance with different recycling categories. For example, attachment mechanism 202 may be designed to fail such that, when it fails, chip assembly 212 is completely separated from body 250, and may be separately discarded from body 250. In some examples, portions of body 250 may be designed to fail such that one or more polymer layers on faces 260, 262 can be peeled away from the rest of body 250 (e.g., via graspable member 222). Body 250 not including the one or more polymer layers may be made of a different material, for example metal which can be separately recycled, or wood which can be separately composted. In this way, different parts of the transaction instrument which may fall into different recycling categories may be separated for disposal.

Cover 216 may be configured to provide access to graspable member 222 when cover 216 destructively yields to force $F_1$. For example, the punctured material of cover 216 may extend from surface 262, allowing it to be grasped. In some examples, surface 262 may include a polymer layer, and the transaction instrument may include a ribbon under the polymer layer, where one end of the ribbon is positioned at cover 216. When cover 216 is punctured, the end of the ribbon may become accessible as graspable member 222. For example, the end of the ribbon may include a curved end portion that lies flat under the cover, or under a polymer layer on second face 262, but when cover 216 destructively yields, the end of the ribbon may curve away from second face 262.

Figure 3A:
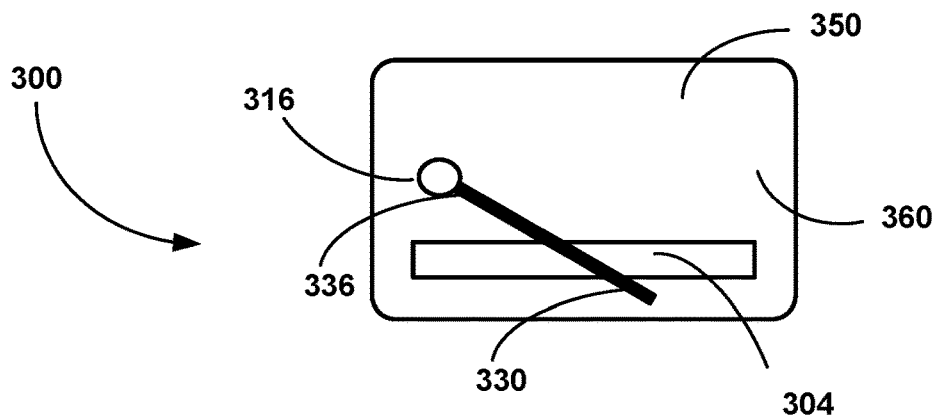
FIGS. 3A-3C are conceptual diagrams illustrating another example transaction instrument, including a ribbon and magnetic stripe on the transaction instrument, in accordance with the techniques of this disclosure.
Figure 3B:
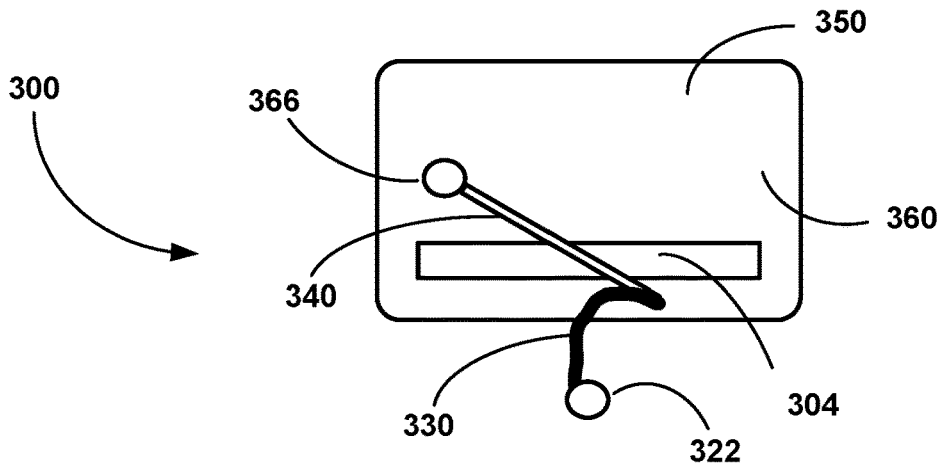
Figure 3C:
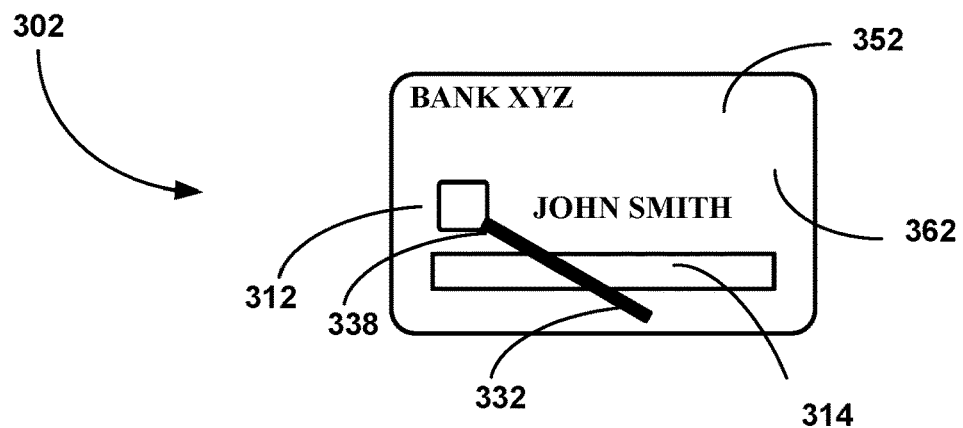

FIGS. 3A-3C are conceptual diagrams illustrating another example transaction instrument 300, including a ribbon 330 and magnetic stripe 304 on transaction instrument 300, in accordance with the techniques of this disclosure. Transaction instrument 300 may be an example of transaction instrument 100 of FIG. 1. In the example of FIGS. 3A and 3B, ribbon 330 and magnetic stripe 304 are positioned on a first face 360 of transaction instrument 300. Ribbon 330 may traverse under a portion of magnetic stripe 304. For example, first face 360 of body 350 may include one or more polymer layers, and ribbon 330 may traverse under the lowest polymer layer that contains magnetic stripe 304.

In some examples, magnetic stripe is disposed on first face 360, and cover 316 is configured to provide access to graspable member 322 when cover 316 destructively yields to a first force. In some examples, one end of ribbon 330 is positioned at cover 316. When cover 316 destructively yields, the end of ribbon 330 may become accessible as graspable member 322. Ribbon 330 may be connected at first end 336 to graspable member 322, such that when graspable member 322 is acted on by a pulling force, graspable member 322 applies a corresponding second force to ribbon 330. For example, the second force may be substantially normal to first face 360, such that ribbon 330 is pulled up and away from first face 360. Ribbon 330 may be configured to transmit at least a portion of the second force exerted on ribbon 330 to magnetic stripe 304. For example, ribbon 330 may exert at least a portion of the second force on the one or more polymer layers on which magnetic stripe 304 is disposed, where the one or more polymer layers are disposed above ribbon 330 with respect to first face 360.

The portion of magnetic stripe 304 under which ribbon 330 traverses may be configured to destructively yield in response to the portion of the second force exerted on ribbon 330. For example, the one or more polymer layers on which magnetic stripe 304 is disposed may contain structural weaknesses 340. Structural weaknesses may consist of perforations in the polymer layers forming a seam, where the polymer layers tear along the seam in response to the portion of the force exerted on ribbon 330, functionally destroying magnetic stripe 304. In some examples, the polymer layers may not tear along the perforations, but may deform sufficiently that magnetic stripe 304 is functionally destroyed. In some examples, the seam of the polymer layers may be configured to weaken when exposed to heat, allowing the polymer layers to destructively yield more easily.

Although described as a "ribbon," ribbon 330 may consist of a string, polymer strip, fabric strip, or other material. The material of ribbon 330 may be strong enough to cause structural weaknesses 340 to destructively yield, without causing ribbon 330 to destructively yield when ribbon 330 is acted on by the second force.

In the example of FIG. 3C, a ribbon 332 and magnetic stripe 314 are positioned on a second face 362 of transaction instrument 302, in accordance with the techniques of this disclosure. Ribbon 332 may traverse under a portion of magnetic stripe 314. For example, second face 362 of body 352 may include one or more polymer layers, and ribbon 332 may traverse under the lowest polymer layer that contains magnetic stripe 314.

In some examples, magnetic stripe is disposed on second face 362, wherein ribbon 332 is connected at first end 338 to chip assembly 312, such that when chip assembly is acted on by a force via the aperture in body 352, chip assembly 312 applies at least a portion of the force to ribbon 332. In some examples, chip assembly 312 may disconnect from body 352 in response to the force, and chip assembly 312 may become a graspable member on which a pulling force may be applied. For example, the force may be substantially normal to second face 362, such that ribbon 332 is pulled up and away from second face 362. Ribbon 332 may be configured to transmit at least a portion of the force to magnetic stripe 314. For example, ribbon 332 may exert a force on the one or more polymer layers on which magnetic stripe 314 is disposed, where the one or more polymer layers are disposed above ribbon 332 with respect to second face 362.

The portion of magnetic stripe 314 under which ribbon 332 traverses may be configured to destructively yield in response to the portion of the force exerted on ribbon 332. For example, the one or more polymer layers on which magnetic stripe 314 is disposed may contain structural weaknesses. The structural weaknesses may consist of perforations in the polymer layers forming a seam, where the polymer layers tear along the seam in response to the portion of the force exerted on ribbon 332, functionally destroying magnetic stripe 314. In some examples, the polymer layers may not tear along the perforations, but may deform sufficiently that magnetic stripe 314 is functionally destroyed. In some examples, the seam of the polymer layers may be configured to weaken when exposed to heat, allowing the polymer layers to destructively yield more easily.

Although described as a "ribbon," ribbon 332 may consist of a string, polymer strip, fabric strip, or other material. The material of ribbon 332 may be strong enough to cause the structural weaknesses to destructively yield, without causing ribbon 332 to destructively yield when ribbon 332 is acted on by a force.

Ribbons 330, 332 may also be positioned under, or attached to one or more antennas of transaction instruments 300, 302, such that when a force is applied to ribbons 330, 332 the one or more antennas destructively yield and are functionally destroyed.

Figure 4:
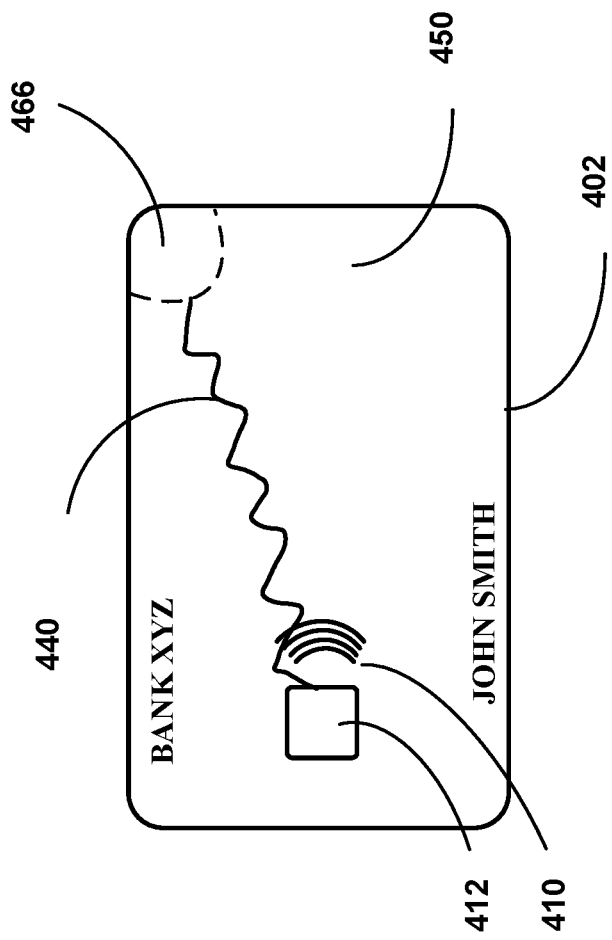
FIG. 4 is a conceptual diagram illustrating another example transaction instrument, including a structural weakness, in accordance with the techniques of this disclosure.

FIG. 4 is a conceptual diagram illustrating another example transaction instrument 400, including a structural weakness 440, in accordance with the techniques of this disclosure. Transaction instrument 400 may be an example of transaction instrument 100 of FIG. 1. Transaction instrument 400 includes edge 402 extending between a first face second face of body 450 along a perimeter of transaction instrument 400. The perimeter may be defined by a profile of transaction instrument 400.

Aperture 466 is located in a portion of edge 402 between the first face and second face. Although aperture 466 is illustrated in FIG. 4 in a corner of transaction instrument 400, aperture 466 may be positioned anywhere along the edge of transaction instrument 400. Body 450 may include a cover on the portion of body 450 over aperture 466. The cover may be configured to destructively yield in response to a force applied to the cover. For example, the cover may be made from a polymer that punctures when acted on by a force from a planar member. In some examples, the cover may be a part of a polymer layer of body 450 on edge 402 of body 450. In some examples, the cover may be designed to blend in with an artistic design on body 450, so that it is not visually apparent where aperture 466 is located on body 450. For example, if edge 402 is white along the perimeter of transaction instrument 400, then the cover may be white over the portion of edge 402 including aperture 466. In some examples, the cover may be configured to weaken when exposed to heat, such that the cover destructively yields more easily in response to a force applied to the cover.

Aperture 466 may be configured to allow a planar member access to an interior of body 450 between the first face and second face. The planar member may be any rigid structure that can puncture the cover (if there is a cover on the particular embodiment) and apply a force to both the first face and second face when torqued while inside aperture 466. For example, the planar member may be a coin, token, or the like, and the coin may be twisted while inside aperture 466 to apply a force to both the first face and the second face.

Body 450 includes structural weakness 440 configured to destructively yield in response to a force applied to the first face and second face from the planar member. The structural weakness 440 may include portions of body 450 with less material, or portions of body 450 with more brittle material configured to destructively yield. The portions of body 450 with structural weakness 440 may destructively yield under significantly less force than portions of body 450 without structural weakness 440. For example, structural weakness may include a plurality of cracks in the interior of body 450, or a plurality of holes that weaken the structural integrity of body 450 at those points.

Structural weakness 440 in body 450 may extend from aperture 466 to at least a portion of chip assembly 412, such that when body 450 destructively yields, body 450 exerts at least a portion of the force on the portion of chip assembly 412. The IC chip of chip assembly 412 may be configured to destructively yield in response to the portion of the force exerted on the portion of chip assembly 412. For example, body 450 may yield such that portions of body 450 at chip assembly 412 pull the IC chip.

Structural weakness 440 in body 450 may also extend through a portion of body 450 containing a portion of magnetic stripe and/or a portion of one or more antennas 410, such that when body 450 destructively yields, body 450 exerts at least a portion of the force on the portions of the magnetic stripe and antennas 410. The magnetic stripe and/or antennas may be configured to destructively yield in response to the portion of the force exerted on each one respectively.

If a substantial portion of the interior of body 450 is removed to form aperture 466, weights may be added to the interior of body 450 near aperture 466 to balance transaction instrument 400 so that it does not feel different from a normal transaction instrument.

In some examples, transaction instrument 400 may be designed such that, in response to the failure of the one or more parts of transaction instrument 400, one or more components of transaction instrument 400 separate from each other in accordance with different recycling categories. In some examples, portions of body 450 may be designed to fail such that one or more polymer layers on faces of body 450 may be peeled away from the rest of body 450. Body 450, as well as internal circuitry of transaction instrument 400 (e.g., chip assembly 412, antennas 410, the magnetic stripe) may be designed to fail such that the circuitry of transaction instrument 400 is pulled out of the interior of body 450. In this way, different parts of the transaction instrument which may fall into different recycling categories may be separated for disposal.

Figure 5A:
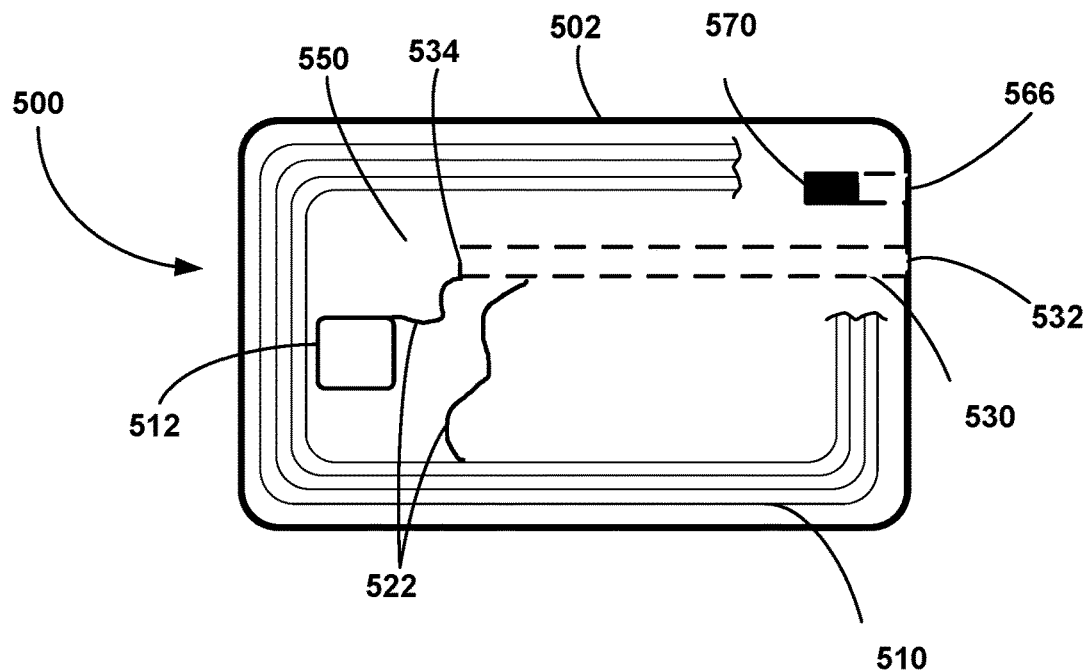
FIGS. 5A and 5B are conceptual diagrams illustrating another example transaction instrument, including a push-release latch, in accordance with the techniques of this disclosure.
Figure 5B:
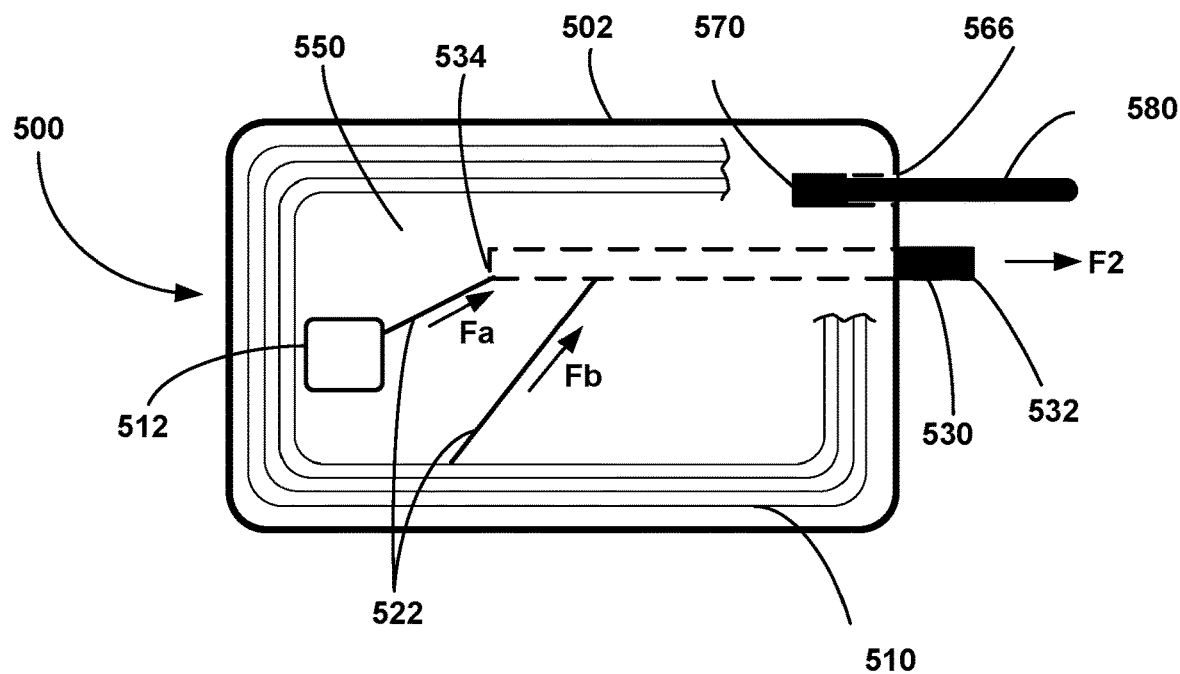

FIGS. 5A and 5B are conceptual diagrams illustrating another example transaction instrument 500, including an internal rod 530 and a push-release latch 570, in accordance with the techniques of this disclosure. Transaction instrument 500 may be an example of transaction instrument 100 of FIG. 1. Transaction instrument 500 includes rod 530 having a length with first end 532 and second end 534 that is housed within body 550. Body 550 further defines edge 502 extending between the first and second face along a perimeter of the transaction instrument. The perimeter may be defined by a profile of transaction instrument 500.

First end 532 of rod 530 is substantially at edge 502 of transaction instrument 500 when rod 530 is in an unejected state as shown in FIG. 5A. An internal channel of body 550 may house rod 530, where the internal channel extends from edge 502 a length into the interior of body 550. In the unejected state, rod 530 may be completely housed within body 550, such that rod 530 does not extend outward from a surface of body 550. In some examples, a thin polymer film may cover edge 502 at the portion of body 550 where first end 532 of rod 530 is positioned. In some examples, no polymer film covers first end 532 of rod 530, and first end 532 is flush with edge 502. First end 532 may be designed to blend in with edge 502 so that it is not easily apparent where first end 532 is positioned on edge 502. For example, if edge 502 is colored white along the perimeter of transaction instrument 500, then first end 532 may be white.

Aperture 566 may be positioned on a portion of edge 502 between the first face and second face adjacent to first end 532 of rod 530. In some examples, transaction instrument 500 may include a cover in the portion of edge 502 over aperture 566. The cover may be configured to destructively yield in response to a force applied to the cover. For example, the cover may be made from a polymer that punctures when acted on by a force from rigid member 580. Rigid member 580 may be any rigid structure that can puncture the cover and pass through aperture 566, such as a paperclip, pen, or the like. In some examples, the cover may be a part of a polymer layer of body 550 on edge 502 of body 550. In some examples, the cover may be designed to blend in with edge 502, so that it is not visually apparent where aperture 566 is located on edge 502. In some examples, the cover may be configured to weaken when exposed to heat, such that the cover destructively yields more easily in response to a force applied to the cover.

Aperture 566 includes a push-release latch 570 inside aperture 566. First end 532 of rod 530 may be configured to eject a distance from edge 502 of body 550 to an ejected state when a force is applied to push-release latch 570, as shown in FIG. 5B. In the ejected state, at least a portion of rod 530 may extend outward from a surface of body 550. For example, rod 530 may include a notch, and body 550 may include a lever connected at a first end to push-release latch 570 and resting in the notch at a second end, wherein the second end of the lever holds rod 530 in place. Push-release latch 570 may be configured to tilt the lever such that the second end of the lever is no longer holding rod 530 in place, allowing 530 to enter an ejected state with the assistance of gravity, shaking transaction instrument 500, or a compressed spring located at second end 534 of rod 530. In some examples, the lever is configured to apply a portion of the force applied to push-release latch 570 to the notch of rod 530 in order to push rod 530 into an ejected state. Once in the ejected state, the lever may not apply any force to rod 530. The notch in rod 530 may not be an indentation, and may simply be the location along the length of rod 530 where an end of the lever comes into contact with rod 530 and may apply a force to rod 530.

Rod 530 is attached at one or more points along the length of rod 530 to at least one of body 550, the attachment mechanism of chip assembly 512, a portion of chip assembly 512, or one or more antennas 510 of transaction instrument 500. In some examples, second end 534 of rod 530 may be attached directly to a portion of chip assembly 512, antennas 510, or the attachment mechanism of chip assembly 512. In some examples, rod 530 may be attached to internal circuitry of transaction instrument 500 via attachment members 522. Attachment members 522 may include a line, string, wire, rod, ribbon, or other mechanism that may be configured to transmit a force between rod 530 and one or more of the internal circuitry of card 500 when in tension.

In the ejected state, rod 530 may be configured to be gripped, and a pulling force $F_2$ may be applied to rod 530. For example, rod 530 may have a reduced diameter portion near first end 532 that allows rod 530 to be gripped. When the pulling force $F_2$ is exerted on rod 530 when in the ejected state, rod 530 may be configured to transmit a corresponding second force (e.g., force $F_a$, force $F_b$) to the at least one of body 550, the attachment mechanism of chip assembly 512, a portion of the chip assembly 512, or one or more antennas 510 of transaction instrument 500. For example, when rod 530 is in an unejected state, the attachment members 522 may be designed to be in a slack state, where attachment members 522 do not apply a force to structures attached to the ends of attachment members 522. When rod 530 is in an ejected state, attachment members may be designed to be pulled taught, such that at least a portion of a pulling force $F_2$ (the second force) may be transmitted through attachment members 522 from rod 530 to one or more of the internal circuitry of card 500. For example, a first portion of the pulling force $F_a$ may exert a force on chip assembly 512, and/or a second portion of the pulling force $F_b$ may exert a force on one or more antennas 510.

The at least one of body 550, the attachment mechanism of chip assembly 512, a portion of the chip assembly 512, or one or more antennas 510 may be configured to destructively yield in response to the portion of the second force. For example, body 550, the attachment mechanism of chip assembly 512, a portion of the chip assembly 512, and/or one or more antennas 510 may include structural weakness configured to destructively yield in response the second force. The structural weakness may include portions of the structures with less material, or with more brittle material configured to destructively yield before other parts of the material. Structural weaknesses may include cracks in the structures, or pre-bent areas that yield under less stress than the material around the cracks and/or bends. In some examples, an IC chip of chip assembly 512 is configured to destructively yield, such that the IC chip of the transaction instrument is destroyed by the second force.

Figure 6:
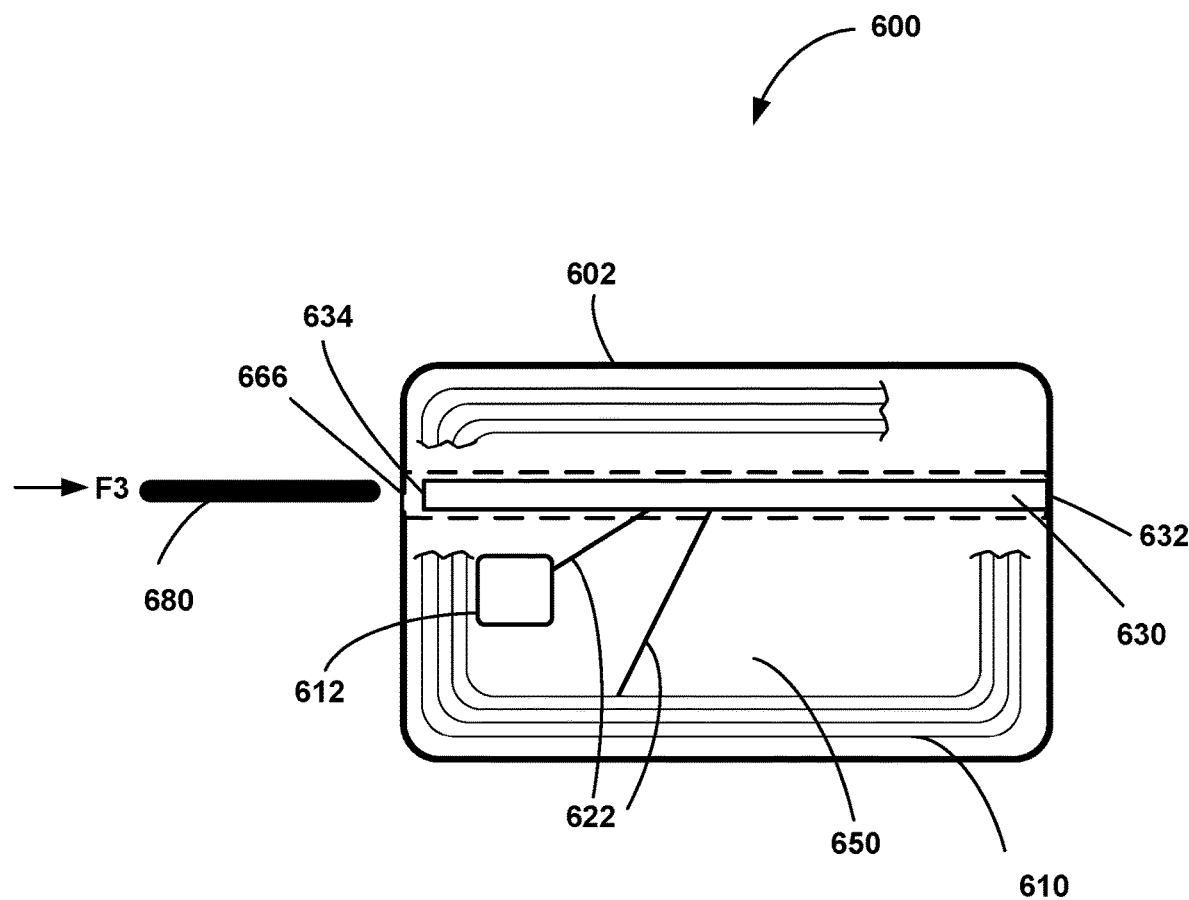
FIG. 6 is a conceptual diagram illustrating another example transaction instrument, including an internal rod, in accordance with the techniques of this disclosure.

FIG. 6 is a conceptual diagram illustrating another example transaction instrument 600, including internal rod 630, in accordance with the techniques of this disclosure. Transaction instrument 600 may be an example of transaction instrument 100 of FIG. 1. Transaction instrument 600 includes rod 630 having a length with first end 632 and second end 634 that is housed within body 650. Body 650 further defines edge 602 extending between the first and second face along a perimeter of the transaction instrument. The perimeter may be defined by a profile of transaction instrument 600.

First end 632 of rod 630 is substantially at edge 602 of transaction instrument 600 when rod 630 has not been subjected to a force by rigid member 680 as shown in FIG. 5A. Second end 634 of rod 630 is near edge 602 of transaction instrument 600 along the perimeter, wherein first end 632 and second end 634 of rod 630 are on opposing sides of the perimeter. Aperture 666 includes a hole in edge 602 extending all the way through body 650 containing rod 630 and configured to allow rigid member 680 access to second end 634 of rod 630. Aperture 666 may define an internal channel of body 650, with openings in body 650 at each end of the channel.

In some examples, a thin cover may be positioned over the openings. In some examples, the cover may be designed to blend in with edge 602, so that it is not visually apparent where aperture 666 is located on edge 602. In some examples, the cover may be configured to weaken when exposed to heat, such that the cover destructively yields more easily in response to a force applied to the cover. The cover may be configured to destructively yield in response to a force applied to the cover. For example, the cover may be made from a polymer that punctures when acted on by a force from rigid member 680. Rigid member 680 may be any rigid structure that can puncture the cover and pass through aperture 666, such as a paperclip, pen, or the like. In some examples, the cover may be a part of a polymer layer of body 650 on edge 602 of body 650.

Rod 630 is attached at one or more points along the length of rod 630 to at least one of body 650, the attachment mechanism of chip assembly 612, a portion of the chip assembly 612, or one or more antennas 610 of transaction instrument 600. Rod 630 is attached to internal circuitry of transaction instrument 600 via attachment members 622. Attachment members 622 may include a line, string, wire, rod, ribbon, or other mechanism that may be configured to transmit a force between rod 630 and one or more of the internal circuitry of card 600 when in tension.

Rod 630 may be configured to transmit at least a portion of a first force $F_3$ exerted on rod 630 by rigid member 680 to the at least one of body 650, the attachment mechanism of chip assembly 612, a portion of the chip assembly 612, or one or more antennas 610 of transaction instrument 600. When first force $F_3$ is exerted on rod 630, rod 630 is configured to transmit at least a corresponding second force to at least one of body 650, the attachment mechanism of chip assembly 612, a portion of the chip assembly 612, or one or more antennas 610 of transaction instrument 600 via attachment members 622 through tension in attachment members 622.

Although force $F_3$ is depicted in FIG. 6 as being applied to second end 634 of rod 630, first end 632 of rod 630 may be configured to receive a force from rigid member 680 as well.

The at least one of body 650, the attachment mechanism of chip assembly 612, a portion of the chip assembly 612, or one or more antennas 610 may be configured to destructively yield in response to the second force. For example, body 650, the attachment mechanism of chip assembly 612, a portion of the chip assembly 612, and/or one or more antennas 610 may include structural weakness configured to destructively yield in response the portion of the force $F_3$ applied to rod 630. The structural weakness may include portions of the structures with less material, or with more brittle material configured to destructively yield before other parts of the material. Structural weaknesses may include cracks in the structures, or pre-bent areas that yield under less stress than the material around the cracks and/or bends.

In some examples, an IC chip of chip assembly 612 is configured to destructively yield, such that the IC chip is destroyed by the portion of the force $F_3$ applied to rod 630.

Figure 7:
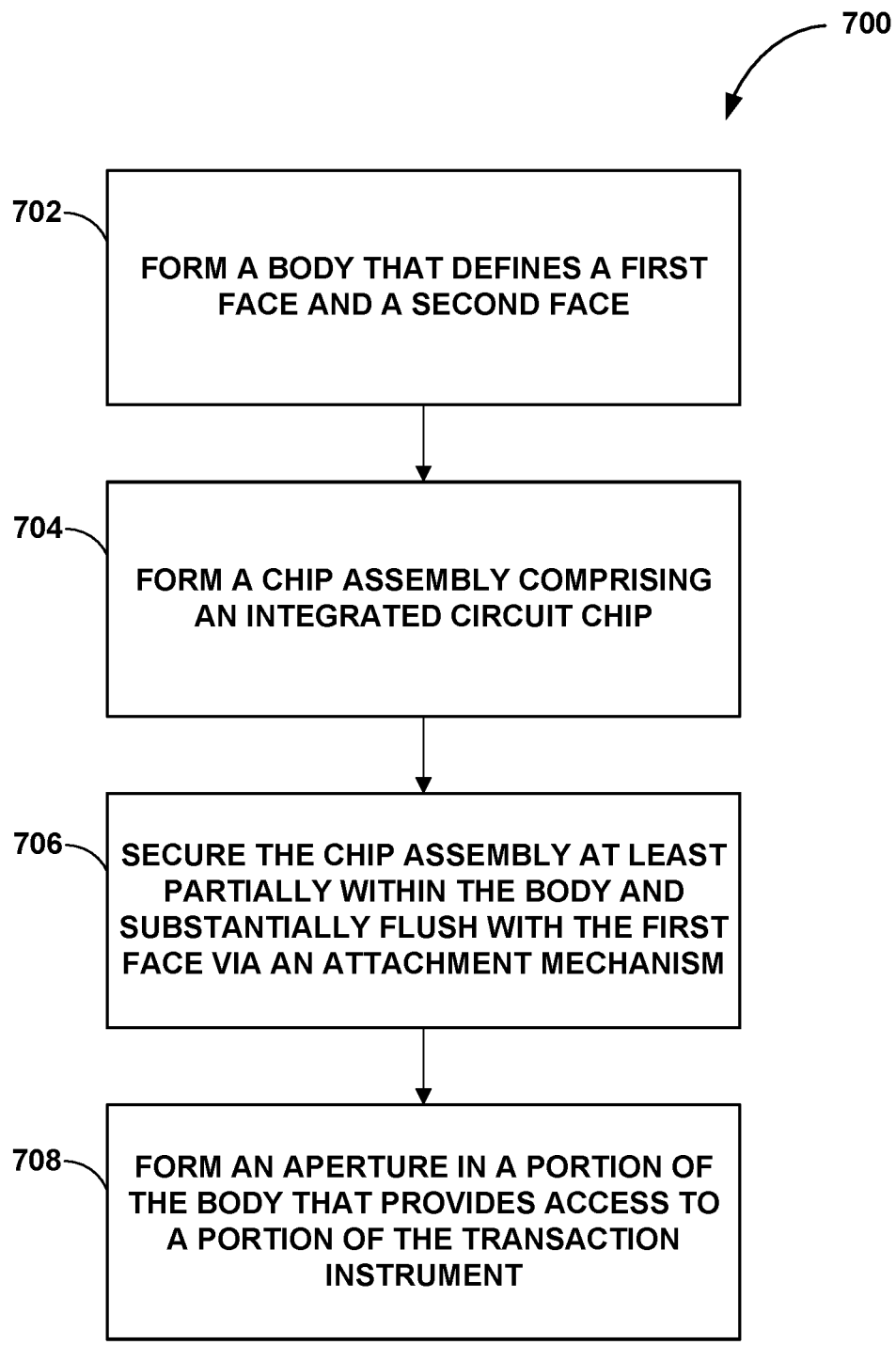
FIG. 7 is a flow diagram illustrating an example operation for manufacturing one or more transaction instruments, in accordance with the techniques of this disclosure.

FIG. 7 is a flow diagram illustrating an example method 700 for manufacturing one or more transaction instruments, in accordance with the techniques of this disclosure. Method 700 includes forming a body that defines a first face and a second face, wherein the first face and second face are on opposing sides of the body (702). The one or more transaction instruments may include a credit card, debit card, or some other type of identifying card that includes a set of unique, identifying information (e.g., a driver's license or student ID, a work badge, a parking card, or a hotel key card). The one or more transaction instruments may be formed into any shape (e.g., rectangular, square, circular, triangular, etc.).

The identifying information stored on the transaction instrument may include information related to a cardholder of the transaction instrument, such as a name, username, telephone number, email address, identification number (e.g., driver's license number, student identification number, work identification number), or the like. The identifying information may include unique financial information about the cardholder, such as an account number, routing number, passcode, PIN, password, or the like that identifies a financial account of the cardholder at a financial institution (e.g., the financial institution that issues the transaction instrument).

The body and faces of the transaction instrument may be made of any material, such as polymer (e.g., polyvinyl chloride acetate), carbon fiber, steel or other metal, wood/pulp, glass, ceramics, or some combination of these or other materials. In some examples, the transaction instrument is made entirely or almost entirely of certain materials. In some examples, the transaction instrument may be made primarily of metal, with one or more thin polymer layers and any payment elements, such as an IC chip, antennas, a magnetic stripe, or the like. In some examples, the body of the transaction instrument may be made primarily from metal, while the faces include a thin polymer layer disposed on top of the body. In some examples, a customized shape or layers of the transaction instrument may be formed via 3D printing. The materials used to manufacture the transaction instrument may be selected to ensure that the transaction instrument is sturdy enough to survive day-to-day use, however the transaction instrument may be difficult to destroy when it expires or is replaced. The faces of the transaction instrument may generally define outer edges of the transaction instrument.

Furthermore, method 700 includes forming a chip assembly comprising an IC chip, an encapsulation around the IC chip, and one or more surface contacts connected to the IC chip via circuitry (704). The transaction instrument may store identifying data on the IC chip, and may transmit data using the antennas. In some examples the transaction instrument may have two or more IC chips. The IC chip may include processing circuitry, a memory to store the identifying data, and a physical connection to the antennas. The IC chip may further include other circuitry components understood by one of ordinary skill in the art to be used to execute the functions of a transaction instrument.

The memory of the IC chip may store sensitive financial information of the user, authentication information, or other information related to the transaction instrument. For example, the IC chip may include user account information linked to the transaction instrument for use during transactions with a merchant's point-of-sale (POS) device or another computing device, the transaction instrument may further include a magnetic stripe for swiping and/or the IC chip may be configured to be readable by a conventional chip reader (e.g., as a result of inserting the transaction instrument into the chip reader). In some examples, the transaction instrument may be configured to utilize the antennas of the transaction instrument even when a transaction is executed using a conventional chip reader (e.g., by sending data using the antennas to initiate a payment transaction or sending transactional details in a receipt signal upon execution of a transaction).

The chip assembly may include the IC chip, which includes processing circuitry and a memory that may contain personal and financial information of a client that should be destroyed when the transaction instrument is replaced. The chip assembly may include surface contacts which are substantially flush with a face of the body of the transaction instrument. The surface contacts may be attached to a substrate, which is attached to an attachment mechanism. The IC chip may be surrounded by an encapsulation, and attached to the substrate via an adhesive. The IC chip may be connected to the surface contacts via circuitry. The circuitry may consist of one or more bond wires. The attachment mechanism may include structural weaknesses designed to fail in response to a force applied via an aperture in the body. In some examples, the attachment mechanism consists of solder joints.

Method 700 also includes securing the chip assembly at least partially within the body and substantially flush with the first face of the body via an attachment mechanism (706). The IC chip may be part of a chip assembly of the transaction instrument. The chip assembly may include the IC chip, an encapsulation around the IC chip, and one or more surface contacts connected to the IC chip via circuitry. The surface contacts may allow the IC chip to communicate with an external device, e.g., a chip reader device, in contact with the contacts, e.g., without using the antennas. The transaction instrument may also include an attachment mechanism configured to secure the chip assembly at least partially within the body, and hold the contacts of the chip assembly substantially flush with at least one of the faces of the body.

When it comes time to replace the transaction instrument, it may be important for clients to destroy the transaction instrument to keep their personal and financial data secure. Destruction may be difficult, especially when the transaction instrument is made of hard materials such as metal. A client may also not know how to properly destroy the transaction instrument so as to prevent access to personal and financial information stored on the transaction instrument. Services may be offered for secure destruction of transaction instruments, however anytime the transaction instrument leaves control of the client, there is potential for another individual to misuse the transaction instrument. An individual with knowledge of the structures of transaction instruments may be able to access personal and financial information even after the body of the transaction instrument is destroyed, if the chip assembly, the IC chip, the antennas, and/or the magnetic stripe remain intact.

Furthermore, method 700 includes forming an aperture in a portion of the body that provides access to a portion of the transaction instrument, wherein at least one of the body, the attachment mechanism, or a portion of the chip assembly is designed to fail in response to a force applied via the aperture in the body, wherein the failure of the at least one of the body, the attachment mechanism, or the portion of the chip assembly, destroys the IC chip of the transaction instrument. (708).

In accordance with the current disclosure, parts of the transaction instrument may be designed to fail to allow for easy destruction of the transaction instrument to prevent unauthorized access to personal and financial information stored on the transaction instrument. For example, at least one of the body, the attachment mechanism of the chip assembly, or a portion of the chip assembly may be designed to fail in response to a force applied via the aperture in the body, and the failure of the at least one of the body, the attachment mechanism, or the portion of the chip assembly, destroys the IC chip of the transaction instrument.

The aperture may provide access to a portion of the transaction instrument. For example, the aperture may provide access to a portion of an interior of the body. The aperture may be located anywhere on the transaction instrument. For example, the aperture may be located in a portion of the body along an edge of the transaction instrument. In some examples, the aperture may be a hole or cutout of any shape (e.g., circular, square, rectangular, triangular, etc.). In some examples, the aperture may include a channel in one or more faces the body, where the channel extends through one or more portions or an entirety of a length of the body. In some examples, the aperture may include multiple perforations in one or more faces of the body. In some examples, the aperture may be designed to blend in with the design of the transaction instrument so that it is not easily apparent where the aperture is located. For example, a design of the transaction instrument may include a number of dark circles on one of the faces, wherein one of the dark circles is the aperture and the other dark circles are part of the artistic design on the faces. A client may be informed of the location of the aperture when the client requests replacement of the transaction instrument.

Forming an aperture may include forming a cover on the portion of the body over the aperture. The cover may be configured to destructively yield in response to a force applied to the cover. For example, the cover may be made from a polymer that punctures when pressed on by a rigid member, such as a paperclip. In some examples, the cover may be a part of a polymer layer of the body on one of the faces. In some examples, the cover may be designed to blend in with the design of the transaction instrument, so that it is not apparent where the aperture is located on the transaction instrument. For example, an artistic design on one or more of the faces of the transaction instrument may include a carriage, wherein an artistic design on the cover is a wheel of the carriage, and the aperture is located in the portion of the body underneath the hub of the wheel. A client may be informed of the location of the cover and the aperture when the client requests replacement of the transaction instrument.

In some examples, forming an aperture includes forming a hole in the second face extending through the body from the second face to the chip assembly, wherein the hole is configured to allow a rigid member access to the chip assembly from the second face, and wherein the attachment mechanism includes structural weaknesses configured to destructively yield in response to a force applied to the chip assembly from the rigid member. For example, the attachment mechanism may include one or more cracks, a plurality of holes, or a material weaker than surrounding material such that portions of the attachment mechanism destructively yield in response to the fore applied to the chip assembly.

In some examples, the hole is configured to allow a rigid member access to the encapsulation of the chip assembly from the second face, and wherein the encapsulation is configured to destructively yield in response to a force applied to the chip assembly from the rigid member. The integrated circuit chip may also be configured to destructively yield in response to the force applied to the chip assembly from the rigid member. In some examples, the encapsulation of the chip assembly may be the first structure the rigid member may interact with on the chip assembly when the rigid member accesses the chip assembly from the second face. The encapsulation may yield in such a way that the force or a portion thereof is applied to the IC chip. The encapsulation may yield in such a way that it destroys the IC chip, through crushing it, or allowing the rigid member to crush the IC chip through the encapsulation. By destroying the IC chip, the memory in IC chip may also be destroyed. In some examples, any number of structures of the chip assembly may be configured to destructively yield in response to a force or a portion thereof applied to the chip assembly.

In some examples, the method may include forming the transaction instrument such that, in response to the failure of the one or more parts of the transaction instrument, one or more components of the transaction instrument separate from each other in accordance with different recycling categories. For example, the attachment mechanism may be designed to fail such that, when it fails, the chip assembly is completely separated from the body, and may be separately discarded from the body. In some examples, portions of the body may be designed to fail such that one or more polymer layers on the faces can be peeled away from the rest of the body (e.g., via a graspable member). The body may be made primarily of one material (e.g., metal), and the one or more polymer layers may be made of a different material. The different materials may be separately recycled. In some examples, the body may be made primarily of or wood, which may be separately composted from other components of the transaction instrument. In this way, different parts of the transaction instrument which may fall into different recycling categories may be separated for disposal.

In some examples, forming a body includes forming a ribbon on the first face of the body traversing under a portion of a magnetic stripe. For example, the first face of the body may include one or more polymer layers, and the ribbon may traverse under the lowest polymer layer that contains the magnetic stripe. The ribbon may be connected at a first end to the chip assembly such that when the chip assembly is acted on by the force via the aperture in the body, the chip assembly applies at least a portion of the force to the ribbon. For example, the portion of the force may be substantially normal to the first face, such that the ribbon is pulled up and away from the first face. Forming the body may also include forming the magnetic stripe on the first face of the body, wherein the portion of the magnetic stripe under which the ribbon traverses is configured to destructively yield in response to the portion of the force exerted on the ribbon. The ribbon may be configured to transmit at least a portion of the force exerted on the ribbon to the magnetic stripe.

The one or more polymer layers on which the magnetic stripe is disposed may contain structural weaknesses. Structural weaknesses may consist of perforations in the polymer layers forming a seam, where the polymer layers tear along the seam in response to the portion of the force exerted on the ribbon, functionally destroying the magnetic stripe. In some examples, the structural weaknesses may consist of thinner sections of the polymer layer, or other methods of weakening the polymer layers along the seam. In some examples, the polymer layers may not tear along the perforations, but may deform sufficiently that the magnetic stripe is functionally destroyed. In some examples, the seam of the polymer layers may be configured to weaken when exposed to heat, allowing the polymer layers to destructively yield more easily. Although described as a "ribbon," the ribbon may consist of a string, polymer strip, fabric strip, or other material. The material of the ribbon may be strong enough to cause the structural weaknesses to destructively yield, without causing the ribbon to destructively yield when the ribbon is acted on by the force.

In some examples, the body of the transaction instrument further defines an edge extending between the first and the second face along a perimeter of the transaction instrument. Forming the aperture may include forming the aperture in a portion of the edge between the first face and second face and configured to allow a planar member access to an interior of the body between the first face and second face. Forming the body may include forming structural weaknesses in the body configured to destructively yield in response to a force applied to the first face and the second face from the planar member.

The planar member may be any rigid structure that can puncture the cover (if there is a cover on the particular embodiment) and apply a force to both the first face and second face when torqued while inside the aperture. For example, the planar member may be a coin, token, or the like, and the coin may be twisted while inside the aperture to apply a force to both the first face and the second face.

The body includes structural weakness configured to destructively yield in response to a force applied to the first face and second face from the planar member. The structural weakness may include portions of the body with less material, or portions of the body with more brittle material configured to destructively yield. The portions of the body with the structural weakness may destructively yield under significantly less force than portions of the body without the structural weakness. For example, structural weakness may include a plurality of cracks in the interior of the body, or a plurality of holes that weaken the structural integrity of the body at those points.

The structural weakness in the body may extend from the aperture to at least a portion of the chip assembly, such that when the body destructively yields, the body exerts at least a portion of the force on the portion of the chip assembly. The portion of the force may destroy the IC chip of the chip assembly. For example, the body may yield such that portions of the body at the chip assembly pull apart the IC chip.

The structural weakness in the body may also extend through a portion of the body containing a portion of magnetic stripe and/or a portion of one or more the antennas, such that when the body destructively yields, the body exerts at least a portion of the force on the portions of the magnetic stripe and the antennas. The magnetic stripe and/or antennas may be configured to destructively yield in response to the portion of the force exerted on each one respectively.

If a substantial portion of the interior of the body is removed to form the aperture, weights may be added to the interior of the body near the aperture to balance the transaction instrument so that it does not feel different from a normal transaction instrument when held.

In some examples, method 700 further includes housing a rod having a length with a first end and a second end within the body. The body may define an edge extending between the first and the second face along a perimeter of the transaction instrument housing the rod, wherein the first end of the rod is substantially at the edge of the transaction instrument when the rod is in an unejected state. An internal channel of the body may house the rod, where the internal channel extends from the edge a length into the interior of the body.

Forming the aperture may include forming a push-release latch on a portion of the edge between the first face and second face that is adjacent to the first end of the rod. The first end of the rod may be configured to eject a distance from the edge of the body to an ejected state when a first force is applied to the push-release latch. For example, the rod may include a notch, and the body may include a lever connected at a first end to the push-release latch and resting in the notch at a second end, wherein the second end of the lever holds the rod in place. The push-release latch may be configured to tilt the lever such that the second end of the lever is no longer holding the rod in place, allowing the rod to enter an ejected state with the assistance of gravity, shaking the transaction instrument, or a compressed spring located at the second end of the rod. In some examples, the lever is configured to apply a portion of the force applied to the push-release latch to the notch of the rod in order to push the rod into an ejected state. Once in the ejected state, the lever may not apply any force to the rod. The notch in the rod may not be an indentation, and may simply be the location along the length of the rod where an end of the lever comes into contact with the rod and may apply a force to the rod.

The rod may be attached at one or more points along the length to at least one of the body, the attachment mechanism, or a portion of the chip assembly of the transaction instrument. In some examples, the second end of the rod may be attached directly to a portion of the chip assembly, the antennas, or the attachment mechanism of the chip assembly. In some examples, the rod may be attached to internal circuitry of the transaction instrument via attachment members. The attachment members may include a line, string, wire, rod, ribbon, or other mechanism that may be configured to transmit a force between the rod and one or more of the internal circuitry of the transaction instrument when in tension.

When a pulling force is exerted on the rod when in the ejected state, the rod may be configured to transmit a corresponding second force to the at least one of the body, attachment mechanism, or a portion of the chip assembly. The at least one of the body, the attachment mechanism, or a portion of the chip assembly may be configured to destructively yield in response to the second force.

In the ejected state, the rod may be configured to be gripped, and a pulling force may be applied to the rod. For example, the rod may have a reduced diameter portion near the first end that allows the rod to be gripped. When the pulling force is exerted on the rod when in the ejected state, the rod may be configured to transmit a corresponding second force to the at least one of the body, the attachment mechanism of the chip assembly, a portion of the chip assembly, or one or more the antennas of the transaction instrument. For example, when the rod is in an unejected state, the attachment members may be designed to be in a slack state, where the attachment members do not apply a force to structures attached to the ends of the attachment members. When the rod is in an ejected state, attachment members may be designed to be pulled taught, such that at least a portion of a pulling force (the second force) may be transmitted through the attachment members from the rod to one or more of the internal circuitry of the transaction instrument.

The at least one of the body, the attachment mechanism of the chip assembly, a portion of the chip assembly, or one or more the antennas may be configured to destructively yield in response to the portion of the second force. For example, the body, the attachment mechanism of the chip assembly, a portion of the chip assembly, and/or one or more the antennas may include structural weakness configured to destructively yield in response the second force. The structural weakness may include portions of the structures with less material, or with more brittle material configured to destructively yield before other parts of the material. Structural weaknesses may include cracks in the structures, or pre-bent areas that yield under less stress than the material around the cracks and/or bends. In some examples, an IC chip of the chip assembly is configured to destructively yield, such that the IC chip of the transaction instrument is destroyed by the second force.

In some examples, method 700 may include housing a rod having a length with a first end and a second end within the body. The body may define an edge extending between the first and the second face along a perimeter of the transaction instrument housing the rod, wherein the first end of the rod is substantially at the edge of the transaction instrument on one side of the transaction instrument and the second end of the rod is near the edge of the transaction instrument on the other side of the transaction instrument. An internal channel of the body may house the rod, where the internal channel extends from the edge a length into the interior of the body.

Forming the aperture may include forming an internal channel in the body of the transaction instrument extending all the way through the body, wherein the channel contains the rod and is configured to allow a rigid member access to the first or second end of the rod. Forming the aperture may include forming openings in the body at each end of the channel. In some examples, forming the aperture includes positioning a thin cover over the openings. In some examples, the cover may be designed to blend in with the edge of the transaction instrument so that it is not visually apparent where the aperture is located. Forming the aperture may include designing the cover to destructively yield in response to a force applied to the cover, for example a force applied by the rigid member. For example, the cover may be made from a polymer that punctures when acted on by a force from the rigid member. The rigid member may be any rigid structure that can puncture the cover and pass through the aperture to apply a force to the rod, such as a paperclip, pen, or the like. In some examples, the cover may be a part of a polymer layer of the body on the edge of the body.

The rod may be attached at one or more points along the length to at least one of the body, the attachment mechanism, or a portion of the chip assembly of the transaction instrument. In some examples, the second end of the rod may be attached directly to a portion of the chip assembly, the antennas, or the attachment mechanism of the chip assembly. In some examples, the rod may be attached to internal circuitry of the transaction instrument via attachment members. The attachment members may include a line, string, wire, rod, ribbon, or other mechanism that may be configured to transmit a force between the rod and one or more of the internal circuitry of the transaction instrument when in tension.

The rod may be configured to transmit at least a portion of a first force exerted on the rod by the rigid member to the at least one of the body, the attachment mechanism of the chip assembly, a portion of the chip assembly, or one or more antennas of the transaction instrument. When the first force is exerted on the rod, the rod may be configured to transmit at least a corresponding second force to at least one of the body, the attachment mechanism of the chip assembly, a portion of the chip assembly, or one or more antennas of the transaction instrument via attachment members within the body through tension in the attachment members.

The at least one of the body, the attachment mechanism of the chip assembly, a portion of the chip assembly, or one or more the antennas may be configured to destructively yield in response to the second force. For example, the body, the attachment mechanism of the chip assembly, a portion of the chip assembly, and/or one or more the antennas may include structural weakness configured to destructively yield in response to the second force. The structural weakness may include portions of the structures with less material, or with more brittle material configured to destructively yield before other parts of the material. Structural weaknesses may include cracks in the structures, or pre-bent areas that yield under less stress than the material around the cracks and/or bends. In some examples, an IC chip of the chip assembly is configured to destructively yield, such that the IC chip of the transaction instrument is destroyed by the second force.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, rather than sequentially.

Various examples have been described. These and other examples are within the scope of the following claims.

What is claimed is:

1. A transaction instrument comprising:
   a body that defines a first face and a second face, wherein the first face and second face are on opposing sides of the body;
   a chip assembly comprising an integrated circuit chip, an encapsulation around the integrated circuit chip, and one or more surface contacts connected to the integrated circuit chip via circuitry;
   an attachment mechanism configured to secure the chip assembly at least partially within the body and hold the chip assembly substantially flush with the first face of the body;
   an aperture in the second face directly behind the chip assembly forming an open hole in a back of the transaction instrument that extends through the body from the second face to the chip assembly, the aperture being configured to allow a rigid member straight down into the hole to access the chip assembly from the second face; and
   one or more structural weaknesses in the attachment mechanism, wherein the attachment mechanism is configured to fail in response to a force applied to the chip assembly from the rigid member, and wherein the failure of the attachment mechanism destroys the integrated circuit chip of the transaction instrument.

2. The transaction instrument of claim 1, wherein, in response to the failure of the attachment mechanism, one or more components of the transaction instrument separate from each other in accordance with different recycling categories.

3. The transaction instrument of claim 1,
   wherein the encapsulation is configured to destructively yield in response to the force applied to the chip assembly from the rigid member; and wherein the integrated circuit chip is configured to destructively yield in response to the force applied to the chip assembly from the rigid member.

4. The transaction instrument of claim 1, wherein the force applied to the chip assembly is a first force, and wherein the transaction instrument further comprises a cover over the aperture in a portion of the body, wherein the cover is configured to destructively yield in response to a second force applied to the cover.

5. The transaction instrument of claim 4, further comprising a magnetic stripe and a ribbon traversing under a portion of the magnetic stripe,
 wherein the magnetic stripe is disposed on the second face;
 wherein the cover is configured to provide access to a graspable member when the cover destructively yields to the second force;
 wherein the ribbon is connected at a first end to the graspable member, such that when the graspable member is acted on by a pulling force, the graspable member applies a corresponding third force to the ribbon;
 wherein the ribbon is configured to transmit at least a portion of the third force exerted on the ribbon to the magnetic stripe; and
 wherein the portion of the magnetic stripe under which the ribbon traverses is configured to destructively yield in response to the portion of the third force exerted on the ribbon.

6. The transaction instrument of claim 4, wherein a first design of the cover blends in with a second design of the transaction instrument to hide a location of the aperture.

7. The transaction instrument of claim 1, further comprising a magnetic stripe and a ribbon traversing under a portion of the magnetic stripe,
 wherein the magnetic stripe is disposed on the first face;
 wherein the ribbon is connected at a first end to the chip assembly such that when the chip assembly is acted on by the force via the aperture in the portion of the body, the chip assembly applies at least a portion of the force to the ribbon; and
 wherein the portion of the magnetic stripe under which the ribbon traverses is configured to destructively yield in response to the portion of the force exerted on the ribbon.

8. The transaction instrument of claim 1, wherein the body is comprised of metal.

9. The transaction instrument of claim 1, wherein one or more components of the transaction instrument are configured to weaken when exposed to heat.

10. A transaction instrument comprising:
 a body comprising:
  a first face and a second face, wherein the first face and second face are on opposing sides of the body, and
  an edge extending between the first face and the second face along a perimeter of the transaction instrument;
 a chip assembly comprising an integrated circuit chip, an encapsulation around the integrated circuit chip, and one or more surface contacts connected to the integrated circuit chip via circuitry;
 an attachment mechanism configured to secure the chip assembly at least partially within the body and hold the chip assembly substantially flush with the first face of the body;
 an aperture in a portion of the edge between the first face and the second face, wherein a projection of the aperture onto the first face defines a circular segment, and wherein the aperture is configured to allow a coin-shaped member access to an interior of the body between the first face and the second face; and
 at least one structural weakness in the body configured to destructively yield in response to a force applied to the first face and the second face from the coin-shaped member, wherein the at least one structural weakness in the body extends from the aperture to at least a portion of the chip assembly, such that when the body destructively yields, the body exerts at least a portion of the force on the portion of the chip assembly, and wherein the integrated circuit chip is configured to destructively yield in response to the portion of the force exerted on the portion of the chip assembly.

11. A transaction instrument comprising:
 a body comprising:
  a first face and a second face, wherein the first face and the second face are on opposing sides of the body, and
  an edge extending between the first face and the second face along a perimeter of the transaction instrument;
 a chip assembly comprising an integrated circuit chip, an encapsulation around the integrated circuit chip, and one or more surface contacts connected to the integrated circuit chip via circuitry;
 an attachment mechanism configured to secure the chip assembly at least partially within the body and hold the chip assembly substantially flush with the first face of the body;
 an aperture in the edge extending from the edge through the body; and
 a rod having a first end, a second end, and a length that is housed within the aperture, wherein, when a first force is exerted on the rod through the aperture, the rod is configured to transmit at least a corresponding second force to the at least one of the body, the attachment mechanism, or a portion of the chip assembly,
  wherein the first end of the rod is substantially at the edge of the transaction instrument when the rod is in an unejected state;
  wherein the body further comprises a push-release latch on a portion of the edge between the first face and the second face that is adjacent to the first end of the rod;
  wherein the first end of the rod is configured to eject a distance from the edge of the body to an ejected state when a third force is applied to the push-release latch;
  wherein the rod is attached at one or more points along the length to at least one of the body, the attachment mechanism, or the portion of the chip assembly of the transaction instrument;
  wherein the first force is a pulling force, and when the pulling force is exerted on the rod while in the ejected state, the rod is configured to transmit the corresponding second force to the at least one of the body, the attachment mechanism, or the portion of the chip assembly;
  wherein the at least one of the body, the attachment mechanism, or the portion of the chip assembly is configured to fail at one or more structural weaknesses in response to the second force; and
  wherein the failure of at least one of the body, the attachment mechanism, or the portion of the chip assembly destroys the integrated circuit chip of the transaction instrument.

12. A transaction instrument comprising:
 a body comprising:

a first face and a second face, wherein the first face and the second face are on opposing sides of the body, and an edge extending between the first face and the second face along a perimeter of the transaction instrument;

a chip assembly comprising an integrated circuit chip, an encapsulation around the integrated circuit chip, and one or more surface contacts connected to the integrated circuit chip via circuitry;

an attachment mechanism configured to secure the chip assembly at least partially within the body and hold the chip assembly substantially flush with the first face of the body;

an aperture in the edge extending from the edge through the body; and a rod having a first end, a second end, and a length that is housed within the aperture, wherein, when a first force is exerted on the rod through the aperture, the rod is configured to transmit at least a corresponding second force to the at least one of the body, the attachment mechanism, or a portion of the chip assembly, wherein the first end of the rod is substantially at the edge of the transaction instrument along the perimeter;

wherein the second end of the rod is near the edge of the transaction instrument along the perimeter, wherein the first end and second end of the rod are on opposing sides of the perimeter;

wherein the aperture extends all the way through the body and configured to allow a rigid member access to the second end of the rod from the edge to apply the first force;

wherein the rod is attached at one or more points along the length to at least one of the body, the attachment mechanism, or the portion of the chip assembly of the transaction instrument;

wherein the at least one of the body, the attachment mechanism, or the portion of the chip assembly is configured to fail at one or more structural weaknesses in response to the second force; and wherein the failure of at least one of the body, the attachment mechanism, or the portion of the chip assembly destroys the integrated circuit chip of the transaction instrument.

13. A method of manufacturing a transaction instrument, comprising:

forming a body that defines a first face and a second face, wherein the first face and second face are on opposing sides of the body;

forming a chip assembly comprising an integrated circuit chip, an encapsulation around the integrated circuit chip, and one or more surface contacts connected to the integrated circuit chip via circuitry;

securing the chip assembly at least partially within the body and substantially flush with the first face of the body via an attachment mechanism;

an aperture in the second face directly behind the chip assembly forming an open hole in a back of the transaction instrument that extends through the body from the second face to the chip assembly, the aperture being configured to allow a rigid member straight down into the hole to access the chip assembly from the second face; and forming one or more structural weaknesses in the attachment mechanism wherein the attachment mechanism is configured to fail in response to a force applied to the chip assembly from the rigid member, wherein the failure of the attachment mechanism destroys the integrated circuit chip of the transaction instrument.

14. The method of claim 13, wherein the encapsulation is configured to destructively yield in response to a force applied to the chip assembly from the rigid member; and wherein the integrated circuit chip is configured to destructively yield in response to the force applied to the chip assembly from the rigid member.

15. The method of claim 13, further comprising forming a cover over the aperture in a portion of the body, wherein the cover is configured to destructively yield in response to a force applied to the cover.

16. The method of claim 13, wherein forming a body comprises:

forming a ribbon on the first face of the body traversing under a portion of a magnetic stripe, wherein the ribbon is connected at a first end to the chip assembly such that when the chip assembly is acted on by the force via the aperture in the body, the chip assembly applies at least a portion of the force to the ribbon; and forming the magnetic stripe on the first face of the body, wherein the portion of the magnetic stripe under which the ribbon traverses is configured to destructively yield in response to the portion of the force exerted on the ribbon.

17. A method of manufacturing a transaction instrument, comprising:

forming a body that defines a first face and a second face, wherein the first face and the second face are on opposing sides of the body and wherein the body further defines an edge extending between the first face and the second face along a perimeter of the transaction instrument;

forming a chip assembly comprising an integrated circuit chip, an encapsulation around the integrated circuit chip, and one or more surface contacts connected to the integrated circuit chip via circuitry;

securing the chip assembly at least partially within the body and substantially flush with the first face of the body via an attachment mechanism;

forming an aperture in a portion of the edge between the first face and the second face, wherein a projection of the aperture onto the first face defines a circular segment, and wherein the aperture is configured to allow a coin-shaped member access to an interior of the body between the first face and the second face; and forming at least one structural weakness in the body configured to destructively yield in response to a force applied to the first face and the second face from the coin-shaped member, wherein the at least one structural weakness in the body extends from the aperture to at least a portion of the chip assembly, such that when the body destructively yields, the body exerts at least a portion of the force on the portion of the chip assembly, and wherein the integrated circuit chip is configured to destructively yield in response to the portion of the force exerted on the portion of the chip assembly.

18. A method of manufacturing a transaction instrument, comprising:

forming a body that defines a first face and a second face, wherein the first face and the second face are on opposing sides of the body and wherein the body further defines an edge extending between the first face and the second face along a perimeter of the transaction instrument;

forming a chip assembly comprising an integrated circuit chip, an encapsulation around the integrated circuit chip, and one or more surface contacts connected to the integrated circuit chip via circuitry;

securing the chip assembly at least partially within the body and substantially flush with the first face of the body via an attachment mechanism;

forming an aperture in the edge extending from the edge through the body; and housing a rod having a first end, a second end, and a length within the aperture, wherein, when a first force is exerted on the rod through the aperture, the rod is configured to transmit at least a corresponding second force to the at least one of the body, the attachment mechanism, or a portion of the chip assembly, wherein the first end of the rod is substantially at the edge of the transaction instrument when the rod is in an unejected state;

wherein forming the body comprises forming a push-release latch on a portion of the edge between the first face and the second face that is adjacent to the first end of the rod;

wherein the first end of the rod is configured to eject a distance from the edge of the body to an ejected state when a third force is applied to the push-release latch;

wherein the rod is attached at one or more points along the length to at least one of the body, the attachment mechanism, or the portion of the chip assembly of the transaction instrument;

wherein the first force is a pulling force, and when the pulling force is exerted on the rod while in the ejected state, the rod is configured to transmit the corresponding second force to the at least one of the body, the attachment mechanism, or the portion of the chip assembly;

wherein the at least one of the body, the attachment mechanism, or the portion of the chip assembly is configured to fail at one or more structural weaknesses in response to the second force; and wherein the failure of at least one of the body, the attachment mechanism, or the portion of the chip assembly destroys the integrated circuit chip of the transaction instrument.

\* \* \* \* \*